United States Patent
Hayashida

(10) Patent No.: US 9,152,852 B2
(45) Date of Patent: Oct. 6, 2015

(54) PERCEPTUAL REACTION ANALYZER, AND METHOD AND PROGRAM THEREOF

(71) Applicant: FUJITSU LIMITED, Kawasaki-shi, Kanagawa (JP)

(72) Inventor: Naoko Hayashida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 14/068,759

(22) Filed: Oct. 31, 2013

(65) Prior Publication Data

US 2014/0145934 A1    May 29, 2014

(30) Foreign Application Priority Data

Nov. 27, 2012   (JP) ................................ 2012-258703

(51) Int. Cl.
    G06Q 30/02    (2012.01)
    G06K 9/00     (2006.01)
(52) U.S. Cl.
    CPC ............ G06K 9/00335 (2013.01); G06Q 30/02 (2013.01)
(58) Field of Classification Search
    CPC ........ G06K 9/002; G06K 9/003; G06F 3/005; G06F 17/20032; G06F 17/30029; G06F 17/30867; G06F 17/30899; G06F 17/30902; G06F 17/30905; G06Q 30/02
    See application file for complete search history.

(56) References Cited

U.S. PATENT DOCUMENTS

| | | | |
|---|---|---|---|
| 5,983,222 A | 11/1999 | Morimoto et al. | |
| 8,751,957 B1 * | 6/2014 | Trajkovic et al. | 715/789 |
| 8,918,411 B1 * | 12/2014 | Latif et al. | 707/758 |
| 2003/0135539 A1 | 7/2003 | Kondo et al. | |
| 2004/0246376 A1 | 12/2004 | Sekiguchi et al. | |
| 2009/0125559 A1 | 5/2009 | Yoshino | |
| 2009/0164503 A1 * | 6/2009 | Jung et al. | 707/102 |
| 2014/0225820 A1 * | 8/2014 | Schwesinger et al. | 345/156 |
| 2015/0109193 A1 * | 4/2015 | Sly et al. | 345/156 |

FOREIGN PATENT DOCUMENTS

| | | |
|---|---|---|
| JP | 9-134363 | 5/1997 |
| JP | 9-147119 | 6/1997 |

(Continued)

OTHER PUBLICATIONS

M. Mahmoud et al., "3D corpus of spontaneous complex mental states," Proceedings of the International Conference on Affective Computing and Intelligent Interaction (Lecture Notes in Computer Science), Oct. 2011, 10 pages.

*Primary Examiner* — Alexander Eisen
*Assistant Examiner* — Cory Almeida
(74) *Attorney, Agent, or Firm* — Staas & Halsey LLP

(57) ABSTRACT

A perceptual reaction analyzer transmits content to the terminals, receives the perceptual reaction information, generates perceptual reaction change information, estimates the presence/absence of interest of the users based on the perceptual reaction change information to classify the users into groups corresponding to the presence/absence of the interest, generates a certainty level which indicates a degree of certainty of the presence/absence of interest, and tries, for a low certainty user, an operation on the content corresponding to the perceptual reaction by which the same presence/absence of interest of the low certainty user is estimated again, based on the perceptual reaction information of a user of which presence/absence of interest is the same as the low certainty user. The perceptual reaction information receiving, the perceptual reaction change information generating and the user grouping are performed after the trial processing, so as to re-estimate the presence/absence of interest of the low certainty user.

21 Claims, 16 Drawing Sheets

(56) References Cited

FOREIGN PATENT DOCUMENTS

| | | |
|---|---|---|
| JP | 2003-304473 | 10/2003 |
| JP | 2005-332266 | 12/2005 |
| JP | 2007-295622 | 11/2007 |
| JP | 2009-117974 | 5/2009 |
| JP | 2010-218491 | 9/2010 |

* cited by examiner

FIG. 5(1)

| EMOTIONAL PERCEPTUAL REACTION | CONTENT TIME T | | | | | |
|---|---|---|---|---|---|---|
| | 0 | 1 | 2 | 3 | 4 | 5 |
| SMILE (POSITIVE) | NO | NO | NO | NO | NO | NO |
| BORED (NEGATIVE) | NO | NO | NO | NO | NO | NO |

FIG. 5(2)

| BEHAVIORAL PERCEPTUAL REACTION | CONTENT TIME T | | | | | |
|---|---|---|---|---|---|---|
| | 0 | 1 | 2 | 3 | 4 | 5 |
| DISTANCE | CLOSE | FAR | CLOSE | CLOSE | CLOSE | FAR |
| DISPLAY AREA | MEDIUM | MEDIUM | MEDIUM | MEDIUM | MEDIUM | MEDIUM |
| SOUND VOLUME | HIGH | MEDIUM | MEDIUM | MEDIUM | MEDIUM | MEDIUM |

FIG. 6(1)

| EMOTIONAL PERCEPTUAL REACTION | CONTENT TIME T | | | | | |
|---|---|---|---|---|---|---|
| | 0 | 1 | 2 | 3 | 4 | 5 |
| SMILE (POSITIVE) | / | NO CHANGE | NO CHANGE | NO CHANGE | NO CHANGE | NO CHANGE |
| BORED (NEGATIVE) | / | NO CHANGE | NO CHANGE | NO CHANGE | NO CHANGE | NO CHANGE |
| TOTAL DETERMINATION | / | DETERMINATION IMPOSSIBLE | DETERMINATION IMPOSSIBLE | DETERMINATION IMPOSSIBLE | DETERMINATION IMPOSSIBLE | DETERMINATION IMPOSSIBLE |

FIG. 6(2)

| BEHAVIORAL PERCEPTUAL REACTION | CONTENT TIME T | | | | | |
|---|---|---|---|---|---|---|
| | 0 | 1 | 2 | 3 | 4 | 5 |
| DISTANCE | / | NEGATIVE | POSITIVE | NO CHANGE | NO CHANGE | NEGATIVE |
| DISPLAY AREA | / | NO CHANGE | NO CHANGE | NO CHANGE | NO CHANGE | NO CHANGE |
| SOUND VOLUME | / | NEGATIVE | NO CHANGE | NO CHANGE | NO CHANGE | NO CHANGE |
| TOTAL DETERMINATION | / | NEGATIVE | POSITIVE | DETERMINATION IMPOSSIBLE | DETERMINATION IMPOSSIBLE | NEGATIVE |

FIG. 7(1)

| EMOTIONAL PERCEPTUAL REACTION CHANGE | NUMBER OF TIMES (T=0~5) |
|---|---|
| POSITIVE | 0 |
| NEGATIVE | 0 |
| DETERMINATION IMPOSSIBLE | 5 |

FIG. 7(2)

| BEHAVIORAL PERCEPTUAL REACTION CHANGE | NUMBER OF TIMES (T=0~5) |
|---|---|
| POSITIVE | 1 |
| NEGATIVE | 2 |
| DETERMINATION IMPOSSIBLE | 2 |

FIG. 7(3)

| ALL THE PERCEPTUAL REACTION CHANGES | NUMBER OF TIMES (T=0~5) |
|---|---|
| POSITIVE | 1 |
| NEGATIVE | 2 |
| DETERMINATION IMPOSSIBLE | 7 |

SUPPORT RATE: 2/10=0.2 (CERTAINTY LEVEL: LOW)

FIG. 9

MECHANICALLY EXECUTABLE INSTRUCTION TABLE 119

| BEHAVIORAL PERCEPTUAL REACTION | OPERATION CONTENT OF PERCEPTUAL REACTION TRIAL |
|---|---|
| SOUND VOLUME | ADJUST SOUND VOLUME OF CONTENT |
| DISTANCE | EXPAND/REDUCE DISPLAY AREA OF CONTENT |
| DISPLAY AREA | EXPAND/REDUCE DISPLAY AREA OF CONTENT |
| ... | ... |

FIG. 10

BEHAVIORAL PERCEPTUAL REACTION INFORMATION OF USER 1

| BEHAVIORAL PERCEPTUAL REACTION | CONTENT TIME T | | | | |
|---|---|---|---|---|---|
| | 0 | 1 | 2 | ... | 5 |
| DISTANCE | 0.6 | 0.3 | 0.7 | ... | 0.3 |
| DISPLAY AREA | 0.6 | 0.6 | 0.7 | ... | 0.7 |
| SOUND VOLUME | 0.9 | 0.7 | 0.7 | ... | 0.7 |

BEHAVIORAL PERCEPTUAL REACTION INFORMATION OF USER 2

| BEHAVIORAL PERCEPTUAL REACTION | CONTENT TIME T | | | | |
|---|---|---|---|---|---|
| | 0 | 1 | 2 | ... | 5 |
| DISTANCE | 0.3 | 0.8 | 0.8 | ... | 0.8 |
| DISPLAY AREA | 0.4 | 0.8 | 0.8 | ... | 0.8 |
| SOUND VOLUME | 0.9 | 0.7 | 0.7 | ... | 0.7 |

BEHAVIORAL PERCEPTUAL REACTION INFORMATION OF USER n

| BEHAVIORAL PERCEPTUAL REACTION | CONTENT TIME T | | | | |
|---|---|---|---|---|---|
| | 0 | 1 | 2 | ... | 5 |
| DISTANCE | 0.7 | 0.7 | 0.7 | ... | 0.3 |
| DISPLAY AREA | 0.9 | 0.3 | 0.3 | ... | 0.3 |
| SOUND VOLUME | 0.9 | 0.1 | 0.1 | ... | 0.1 |

↑

BEHAVIORAL PERCEPTUAL REACTION CHANGE INFORMATION OF USER 1

| BEHAVIORAL PERCEPTUAL REACTION | CONTENT TIME T | | | | |
|---|---|---|---|---|---|
| | 0 | 1 | 2 | ... | 5 |
| DISTANCE | | -0.3 | 0.4 | ... | -0.4 |
| DISPLAY AREA | | 0 | 0.1 | ... | 0 |
| SOUND VOLUME | | -0.2 | 0 | ... | 0 |

BEHAVIORAL PERCEPTUAL REACTION CHANGE INFORMATION OF USER 2

| BEHAVIORAL PERCEPTUAL REACTION | CONTENT TIME T | | | | |
|---|---|---|---|---|---|
| | 0 | 1 | 2 | ... | 5 |
| DISTANCE | | 0.5 | 0 | ... | 0 |
| DISPLAY AREA | | 0.4 | 0 | ... | 0 |
| SOUND VOLUME | | -0.2 | 0 | ... | 0 |

BEHAVIORAL PERCEPTUAL REACTION CHANGE INFORMATION OF USER n

| BEHAVIORAL PERCEPTUAL REACTION | CONTENT TIME T | | | | |
|---|---|---|---|---|---|
| | 0 | 1 | 2 | ... | 5 |
| DISTANCE | | 0 | 0 | ... | -0.4 |
| DISPLAY AREA | | -0.6 | 0 | ... | 0 |
| SOUND VOLUME | | -0.8 | 0 | ... | 0 |

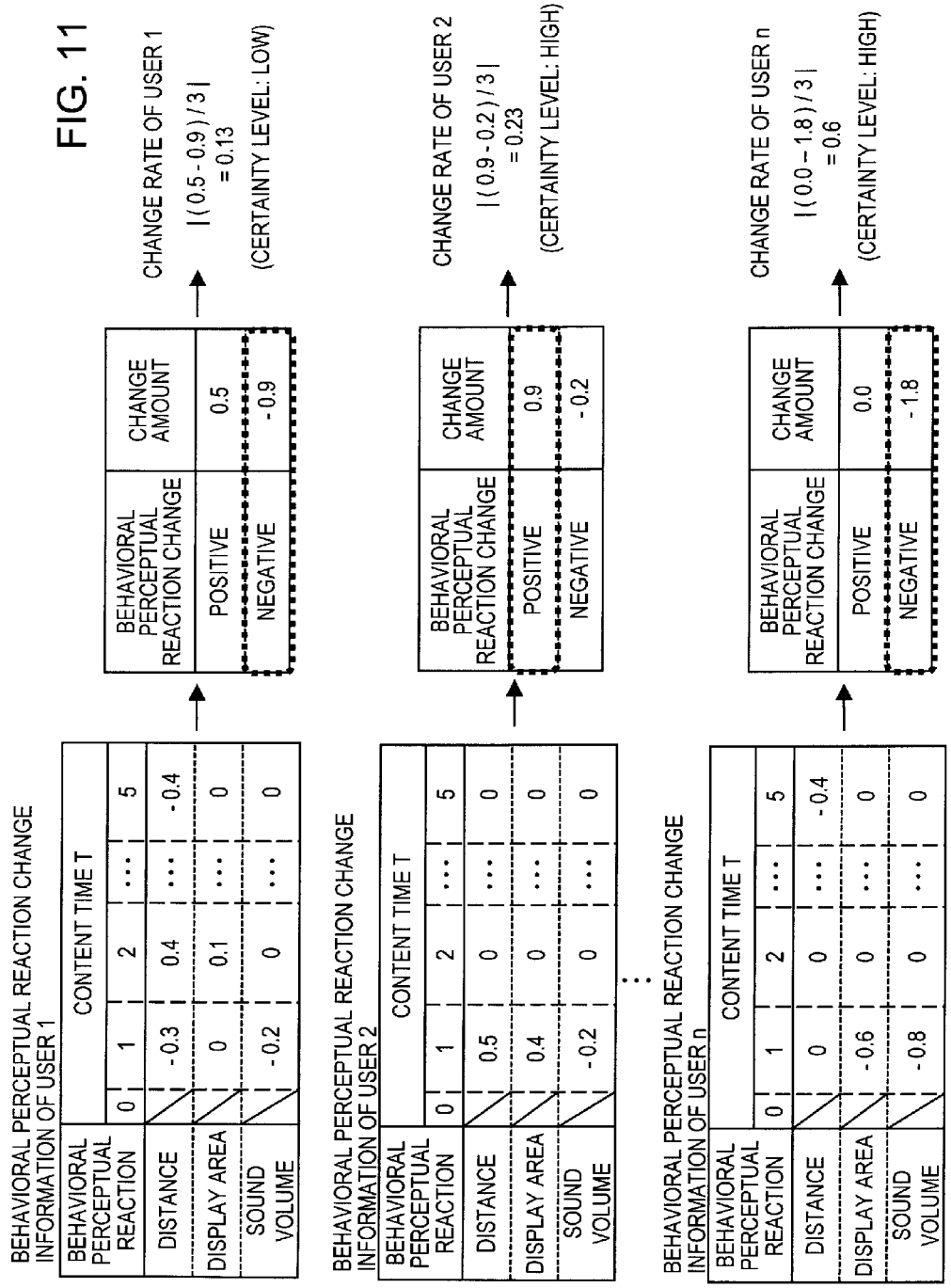

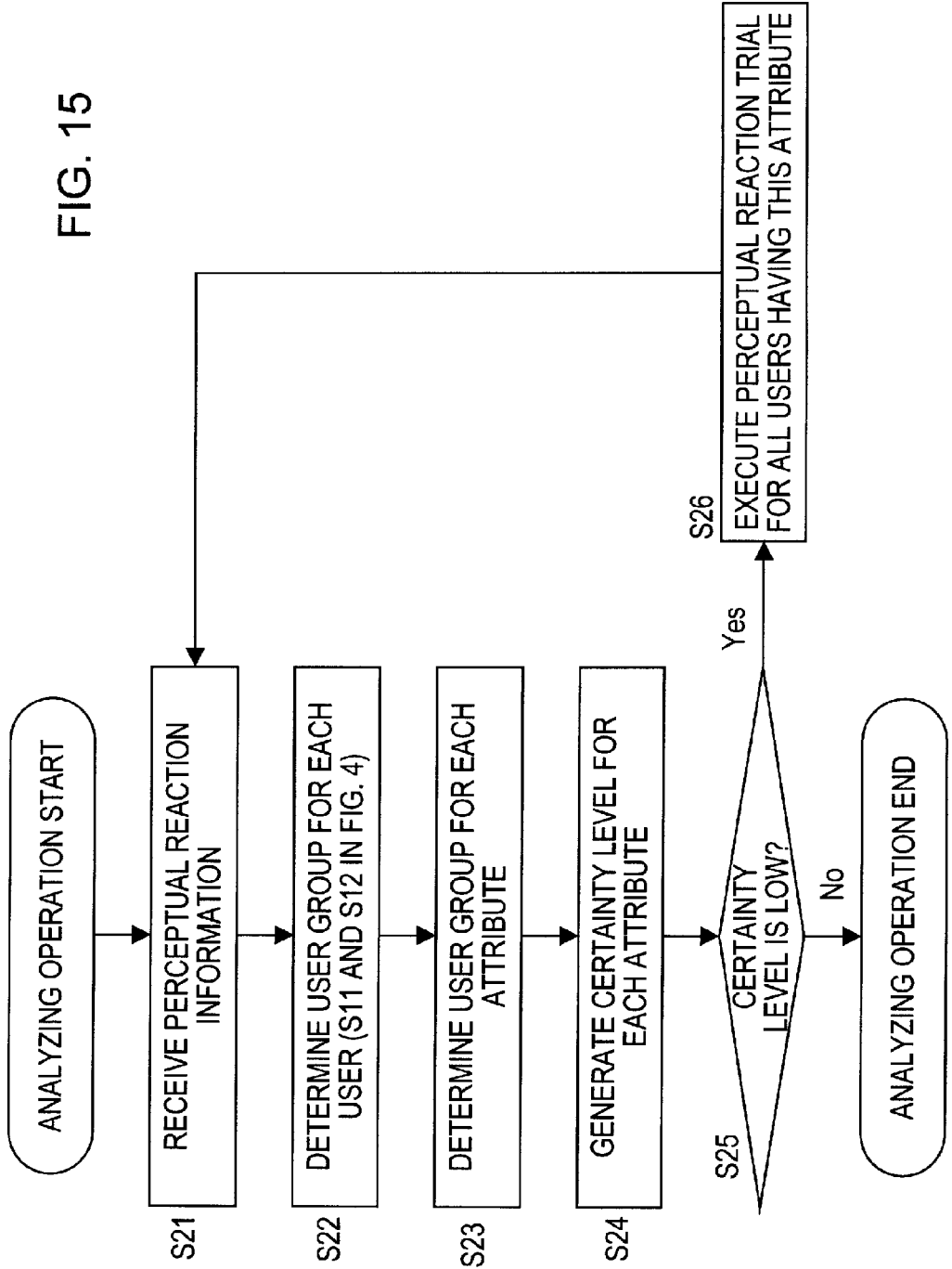

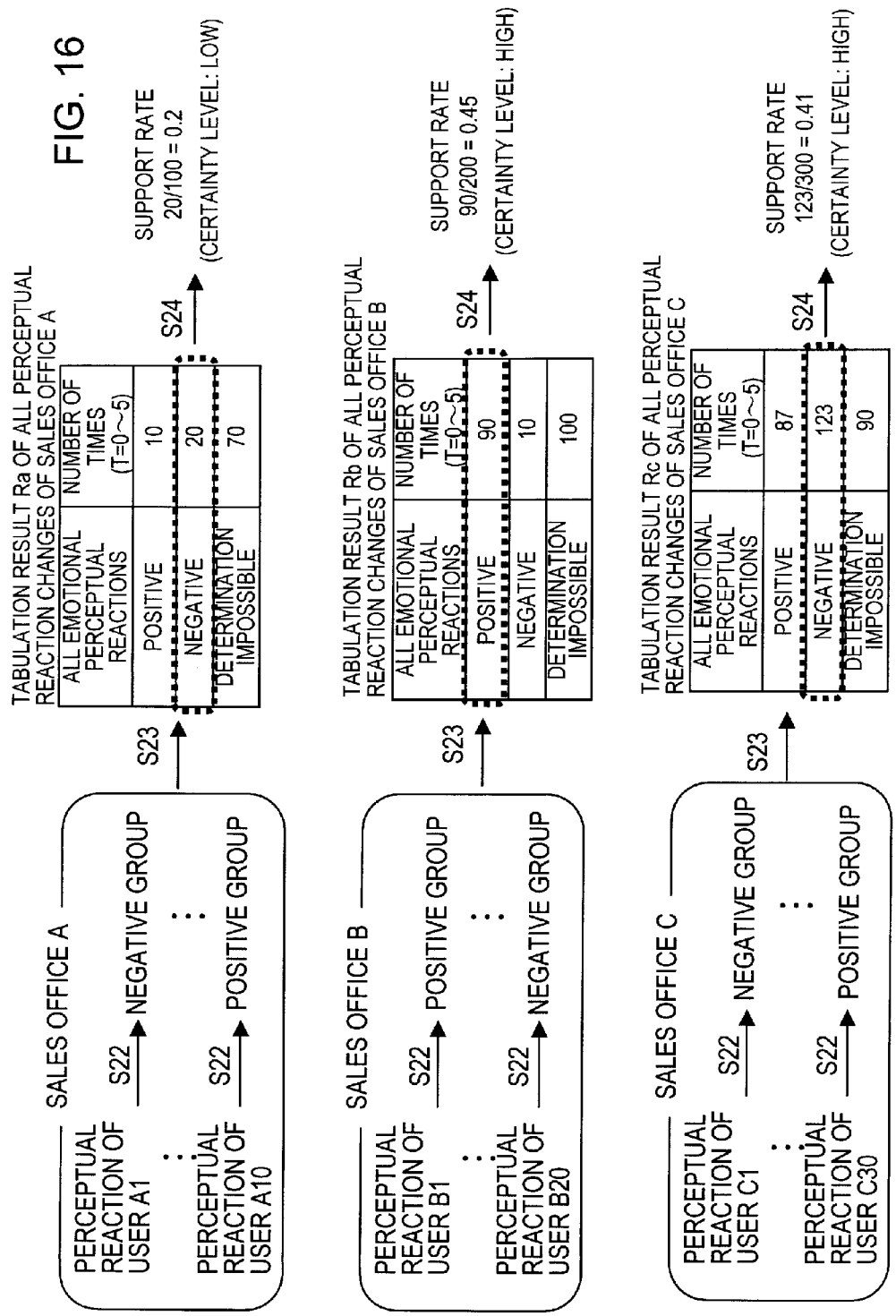

PERCEPTUAL REACTION ANALYZER, AND METHOD AND PROGRAM THEREOF

CROSS-REFERENCE TO RELATED APPLICATION

This application is based upon and claims the benefit of priority of the prior Japanese Patent Application No. 2012-258703, filed on Nov. 27, 2012, the entire contents of which are incorporated herein by reference.

FIELD

The present invention relates to a perceptual reaction analyzer, and a method and a program thereof.

BACKGROUND

In response to a perceived object, such as an object seen or heard, people exhibit a perceptual reaction, such as making a facial expression or gesturing to express emotion. After perceiving the same object a plurality of times, the perceptual reaction of a person to the object may differ from the first time, therefore it is difficult to predict the perceptual reaction of the person simply based on skill or attributes such as gender and age.

Conventionally a technique to estimate human emotion by analyzing perceptual reaction is known. Such a technique is sometimes used for estimating whether a user has an interest, concern or eagerness to receive information (hereafter collectively referred to as "interest") about the content, for example, based on the expression or the like of a user who is looking at the content, such as images, distributed by a server. Thereby the interest of the user about the content can be known, and the result can be fed back for improvement of the content.

SUMMARY

However the interest held by an individual may not be clearly expressed. For example, if a user is looking at the content alone they may hardly change their facial expression even if the user is interested in the content. As a result, it is difficult to estimate user' interest based on their facial expression. If the user moves slightly forward, for example, this motion alone cannot determine whether the user is interested in the content or not. Thus it is difficult to correctly determine whether the user is interested in the content or not if the perceptual reaction of the user is not obvious.

According to one aspect of the present embodiment, a perceptual reaction analyzer that transmits content to a plurality of terminals connected via a network and estimates presence/absence of interest of users of the plurality of terminals, based on perceptual reaction information generated by each of the terminals detecting perceptual reaction of the user of the terminal on the content for a predetermined period, the perceptual reaction analyzer includes:

a content transmitting unit configured to perform a content transmitting processing to transmit content to the terminals;

a perceptual reaction information receiving unit configured to perform a perceptual reaction information receiving processing to receive the perceptual reaction information detected by each of the plurality of terminals;

a perceptual reaction change generating unit configured to perform a perceptual reaction change information generating processing to generate perceptual reaction change information which indicates a change of perceptual reaction of the users of the plurality of terminals based on the received perceptual reaction information;

a user grouping unit configured to perform a user grouping processing to estimate the presence/absence of interest of the users of the plurality of terminals based on the perceptual reaction change information, and classify the users into groups corresponding to the presence/absence of the interest;

a certainty level generating unit configured to perform a certainty level generating processing to generate a certainty level which indicates a degree of certainty of the presence/absence of interest estimated for each user based on the perceptual reaction change information; and a perceptual reaction trial unit configured to perform a perceptual reaction trial processing to try, for a low certainty user of which certainty level is lower than a threshold, an operation on the content corresponding to the perceptual reaction by which the same presence/absence of interest of the low certainty user is estimated again, based on the perceptual reaction information of a user of which presence/absence of interest is the same as the low certainty user, wherein the perceptual reaction information receiving processing, the perceptual reaction change information generating processing and the user grouping processing are performed after the perceptual reaction trial processing, such that interest re-estimating processing to estimate the presence/absence of interest of the low certainty user with respect to the tried operation is performed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5(1) and FIG. 5(2) are an example of perceptual reaction information according to the first embodiment.

FIG. 6(1) and FIG. 6(2) are an example of the perceptual reaction change information according to the first embodiment.

FIG. 7(1) to FIG. 7(3) are an example of the user group determination process according to the first embodiment.

FIG. 9 is an example of the mechanically executable instruction table according to the first embodiment.

FIG. 10 is an example of perceptual reaction information and perceptual reaction change information according to the second embodiment.

FIG. 11 is an example of the process to determine a user group according to the second embodiment.

FIG. 15 is a flow chart depicting an analyzing operation by the perceptual reaction analyzer according to the third embodiment.

FIG. 16 is an example of a process to determine a user group according to the third embodiment.

DESCRIPTION OF EMBODIMENTS

Embodiments of the present invention will now be described with reference to the drawings.

Figure 1:
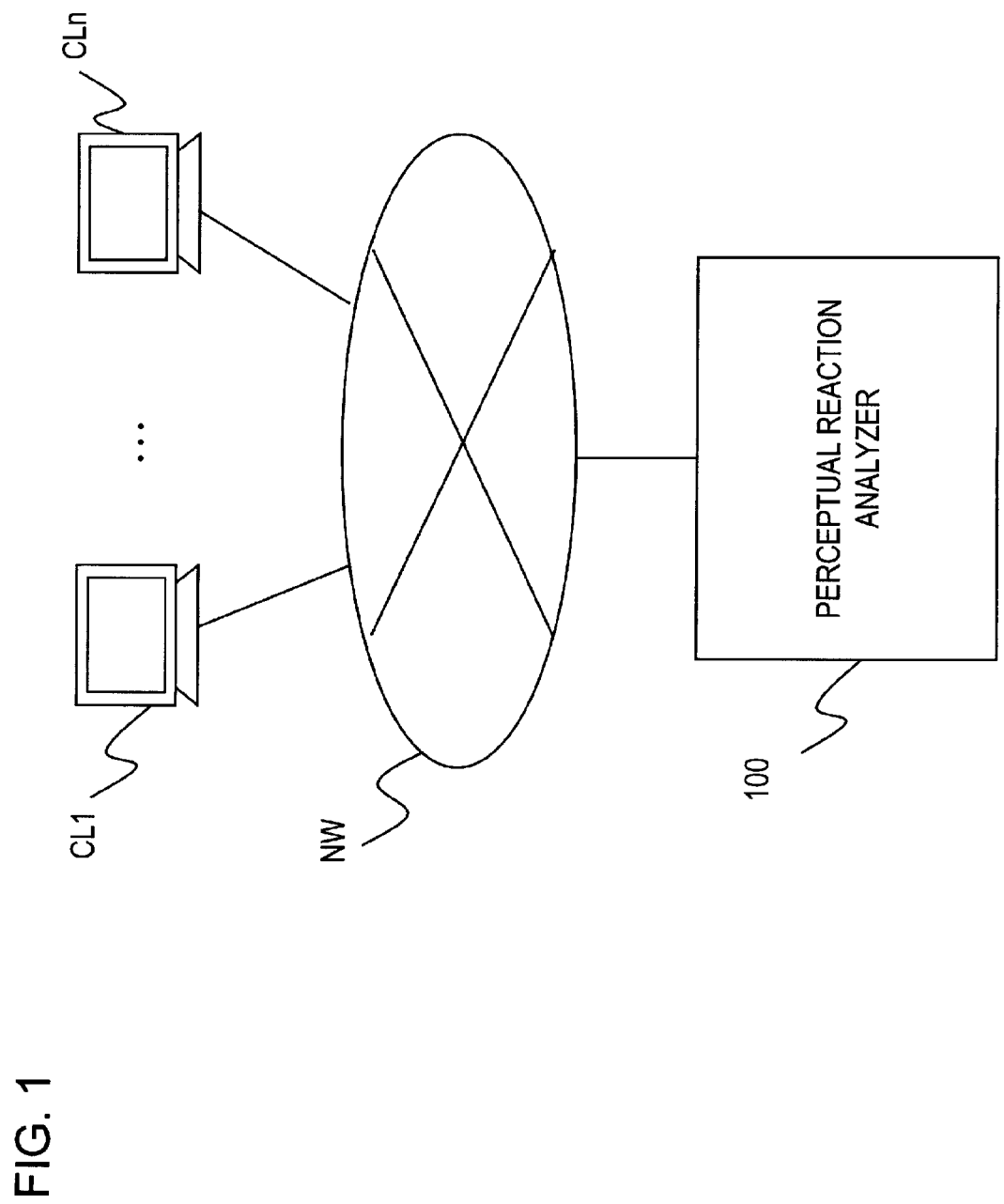
FIG. 1 is a diagram depicting a perceptual reaction analyzing system according to the present embodiment.

FIG. 1 is a diagram depicting a perceptual reaction analyzing system according to the present embodiment. A plurality of terminals CL1 to CLn are connected with a perceptual reaction analyzer 100 via a network NW. The perceptual reaction analyzer 100 distributes such content as images to the plurality of terminals CL1 to CLn via the network NW.

The terminals CL1 to CLn are devices that display the content distributed from the perceptual reaction analyzer 100, such as a portable telephone, a tablet terminal and a personal computer. The network NW is a LAN, Internet, a leased line provided by a common carrier or the like, or an IP network combining these networks.

The terminals CL1 to CLn output the distributed content to such output devices as a display. At the same time, each terminal CL1 to CLn detects the perceptual reaction of the user who views the content via a perceptual reaction detection device (not shown), such as a camera, and detects an environment state where the terminal is installed via an environment state detection device (not shown), such as a directional microphone, at every predetermined period (detection period). Then each terminal CL1 to CLn transmits the detected perceptual reaction to the perceptual reaction analyzer 100 as perceptual reaction information, and transmits the detected environmental state to the perceptual reaction analyzer 100 as environmental state information.

The perceptual reaction that each terminal CL1 to CLn detects includes not only an emotional perceptual reaction, such as a change of facial expressions and gestures, but also a behavioral perceptual reaction, such as the user moving closer to or away from the terminal, increasing or decreasing the sound volume, and expanding or reducing the display area of the content on the display. This is because users sometimes express interest not by an emotional perceptual reaction but by a behavioral perceptual reaction.

The environmental state where the terminal is installed is, for example, the noise state, the temperature and the concentration of individuals around the terminal.

Based on the perceptual reaction information received from the terminals CL1 to CLn, the perceptual reaction analyzer 100 estimates whether each user is interested in the content or not. Then based on the interest of the user and the environmental state information, the perceptual reaction analyzer 100 controls the content to be distributed to the terminals CL1 to CLn, such as by changing the content to be distributed to each user, or switching the display for each user. For example, if the user shows interest in a product displayed on an indoor terminal, the perceptual reaction analyzer 100 displays a discount coupon on this terminal.

If the length of time when the user of each terminal CL1 to CLn showed interest is short in the detection period, or if the perceptual reaction to indicate interest is weak, the estimation by the perceptual reaction analyzer 100 on the interest of the user is not always correct. In other words, if the data volume based on which the interest of the user is determined is limited and the rest is data that cannot be used to determined the interest of the user, or if the change of data to indicate the perceptual reaction of the user is subtle, for example, then the degree of certainty about the interest of the user estimated by the perceptual reaction analyzer 100 is low.

Therefore according to this embodiment, the perceptual reaction analyzer 100 uses an index called a "certainty level", which is described later, in order to determine the degree of certainty about the estimated interest. The perceptual reaction analyzer 100 not only estimates whether the user is interested in the content, but also generates a certainty level based on the received perceptual reaction information.

If the certainty level is low, that is, if the degree on how certain the estimated interest is low, then the perceptual reaction analyzer 100 tries, for this user, an operation on the content corresponding to the perceptual reaction by which the same presence/absence of interest as this user is estimated again (perceptual reaction trial). According to this embodiment, the perceptual reaction analyzer 100 determines the content of the perceptual reaction trial based on the perceptual reaction of this user, or the perceptual reaction of another user for which the same interest as this user was estimated. Then the perceptual reaction analyzer 100 executes the determined perceptual reaction trial on the terminal of this user, and the interest of this user is estimated again based on the perceptual reaction information of this user received via the perceptual reaction trial, and the certainty level is calculated. Thereby the perceptual reaction analyzer 100 estimates whether the user is interested in the content or not with a higher certainty level.

For example, if the perceptual reaction analyzer 100 estimates that a user is not interested in the content, and the certainty level thereof is low, then it is not clear whether the user is not really interested in the content. Therefore as the perceptual reaction trial, the perceptual reaction analyzer 100 decreases the sound volume of the content that this user is viewing, so as to know whether this user's perceptual reaction indicates no interest in the next detection period as well. If the user indicates no reaction to the content with reduced sound volume, then the perceptual reaction analyzer 100 regards that this user accepted the perceptual reaction trial operation, and estimates that this user is not interested in the content with a higher certainty level. Whereas if the user' perceptual reaction indicates that the user is interested in the content, such as by increasing the sound volume or moving closer to the terminal, then the perceptual reaction analyzer 100 regards that the perceptual reaction trial operation was rejected, and estimates that the user is interested in the content with a higher certainty level.

Figure 2:
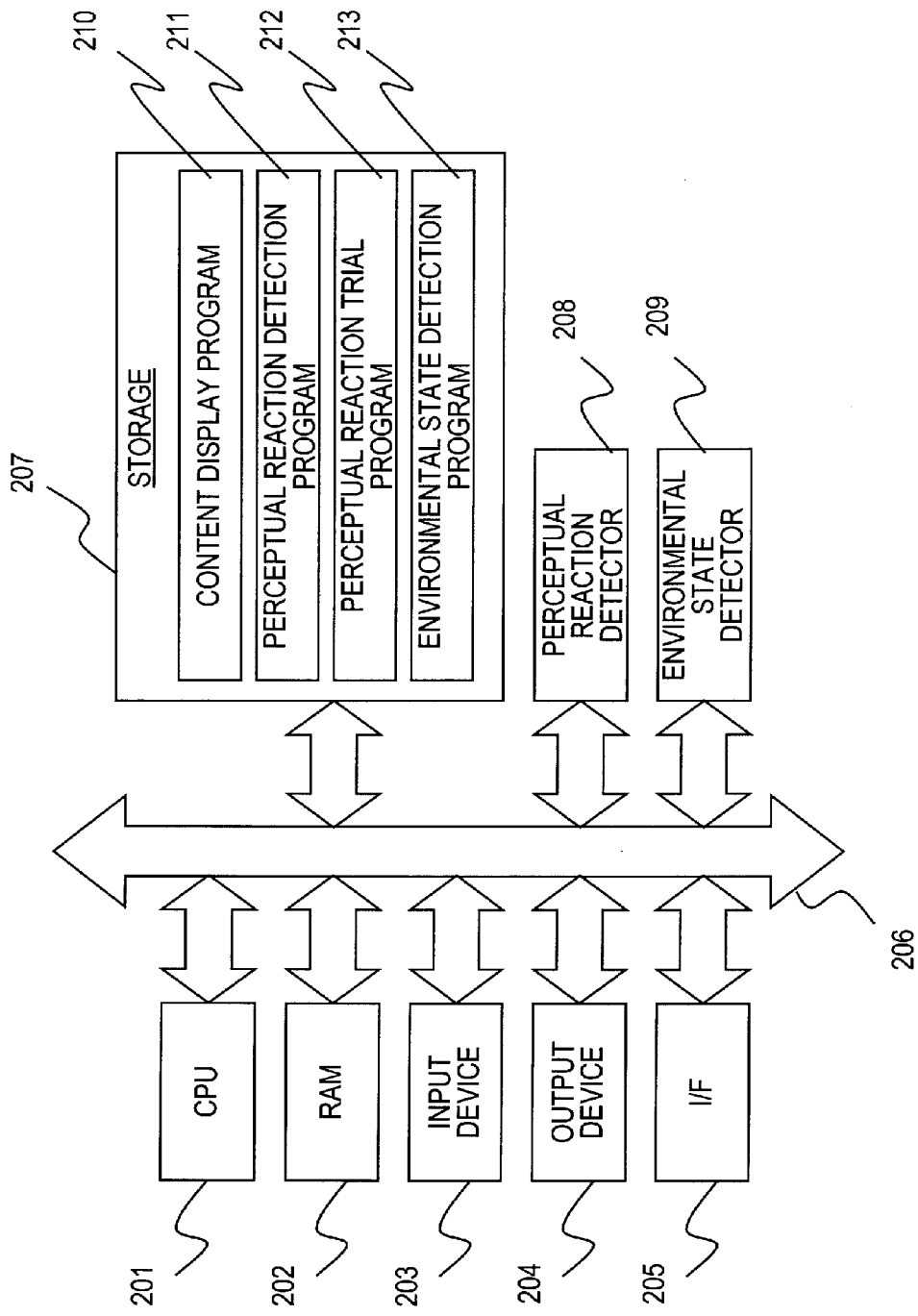
FIG. 2 is a diagram depicting a configuration of the terminal according to this embodiment.

FIG. 2 is a diagram depicting a configuration of the terminal according to this embodiment.

The terminal CL in FIG. 2 includes a CPU 201, a RAM 202, an input device 203 such as a mouse and keyboard, an output device 204 such as a display, an interface 205 to be connected to a network NW, A bus 206, a storage 207, a perceptual reaction detector 208 such as a camera, which detects the perceptual reaction of the user who uses the terminal, and an environmental state detector 209 which detects the environmental state where the terminal is installed. Each terminal CL1 to CLn in FIG. 1 has the same configuration as the terminal CL in FIG. 2.

The perceptual reaction detector 208 detects not only such emotional perceptual reactions as facial expressions and orientation of the user, and such emotional perceptual reactions as gestures, but also behavioral perceptual reactions, such as the user adjusting the sound volume of the terminal, changing the distance between the user and the terminal, or expanding or reducing the content display area on the terminal.

The environmental state detector is, for example, a directional microphone that detects the ambient noise state, a thermometer that measures ambient temperature, and a camera that detects the number of individuals in front of the output device 204 of the terminal.

The storage 207 stores various programs including a content display program 210 which displays content received from the perceptual reaction analyzer 100 on the output device 204, a perceptual reaction detection program 211 which generates perceptual reaction information by linking the perceptual reaction detected by the perceptual reaction detector 208 with the content viewed by the user, and transmits the perceptual reaction information to the perceptual reaction analyzer 100, a perceptual reaction trial program 212 that controls execution of the perceptual reaction trial, and an environmental state detection program 213 which generates environmental state information based on the detected environmental state, and transmits the environmental state information to the perceptual reaction analyzer 100, and data required for executing the programs.

The RAM 202 stores various programs which the CPU 201 loaded from the storage 207 and temporary data.

Figure 3:
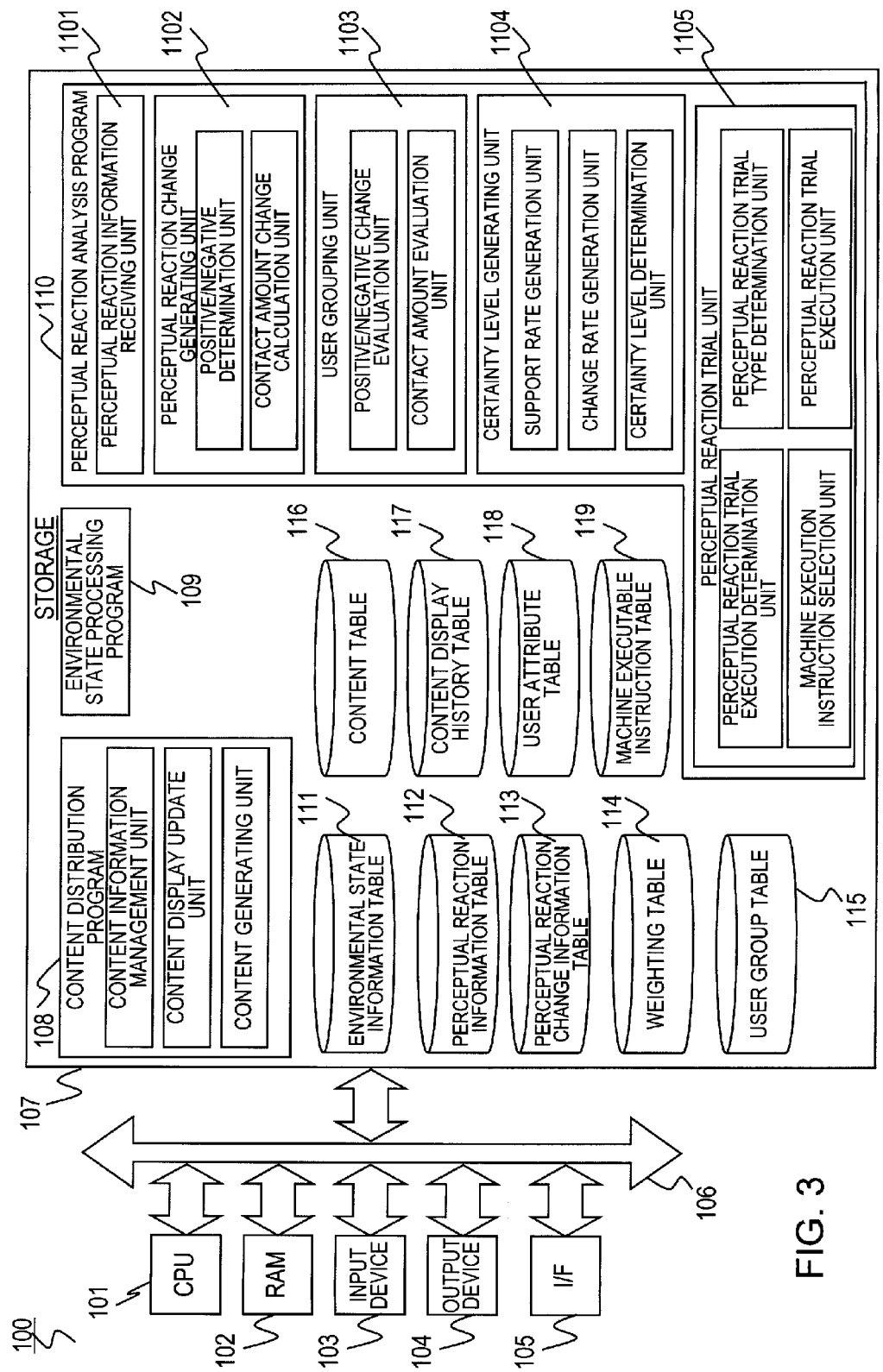
FIG. 3 is a diagram depicting the perceptual reaction analyzer according to this embodiment.

FIG. 3 is a diagram depicting the perceptual reaction analyzer according to this embodiment.

The perceptual reaction analyzer 100 includes a CPU 101, a RAM 102, an input device 103 such as a mouse and keyboard, an output device 104 such as a display, an interface 105 to be connected to a network NW, a bus 106 and a storage 107.

The storage 107 stores various programs including a content distribution program 108 that generates content and distributes the content to the terminals CL1 to CLn, an environmental state processing program 109 that receives environmental state information from the terminals CL1 to CLn and analyzes the ambient environment of the terminals CL1 to CLn, and a perceptual reaction analysis program 110 that estimates whether the user of the terminal is interested in the content based on the perceptual reaction information received from the terminals CL1 to CLn. The storage 107 also stores data required for executing the programs, including an environmental state information table 111 that stores environmental state information received from the terminals CL1 to CLn, a perceptual reaction information table 112 that stores the received perceptual reaction information, a later mentioned perceptual reaction change information table 113 mentioned later, a weighting table 114, a user group table 115, a content table 116 that stores content to be distributed to the terminals CL1 to CLn, a content display history table 117 that stores the history of content distributed to the terminals CL1 to CLn, a user attribute table 118 that stores attributes (e.g. age, gender, affiliation) of each user of the terminals CL1 to CLn, and a machine executable instruction table 119 that stores operation content performed by the perceptual reaction analyzer 100 in a perceptual reaction trial.

The RAM 102 stores various programs which the CPU 101 loaded from the storage 107, and temporary data.

The CPU 101 executes various programs stored in the storage 107, and controls each device in the perceptual reaction analyzer 100. For example, the CPU 101 executes the perceptual reaction analysis program 110, and implements the functions of a perceptual reaction information receiving unit 1101, a perceptual reaction change generating unit 1102, a user grouping unit 1103, a certainty level generating unit 1104, and a perceptual reaction trial unit 1105.

The perceptual reaction information receiving unit 1101 receives perceptual reaction information transmitted from the terminals CL1 to CLn, and stores the information in the perceptual reaction information table 112.

The perceptual reaction change (or transformation) generating unit 1102 reads perceptual reaction information from the perceptual reaction information table 112, and generates perceptual reaction change (or transformation) information that indicates the change of perceptual reactions during a detection period of each terminal, and stores the information in the perceptual reaction change information table 113.

The user grouping unit 1103 reads the perceptual reaction change information from the perceptual reaction change information table 113, and determines whether each user is interested in the content, and divides the users into groups depending on the determination result.

The certainty level generating unit 1104 calculates the certainty level of the interest of each user based on the perceptual reaction information.

The perceptual reaction trial unit 1105 executes the perceptual reaction trial for a user for which certainty level is low.

Figure 4:
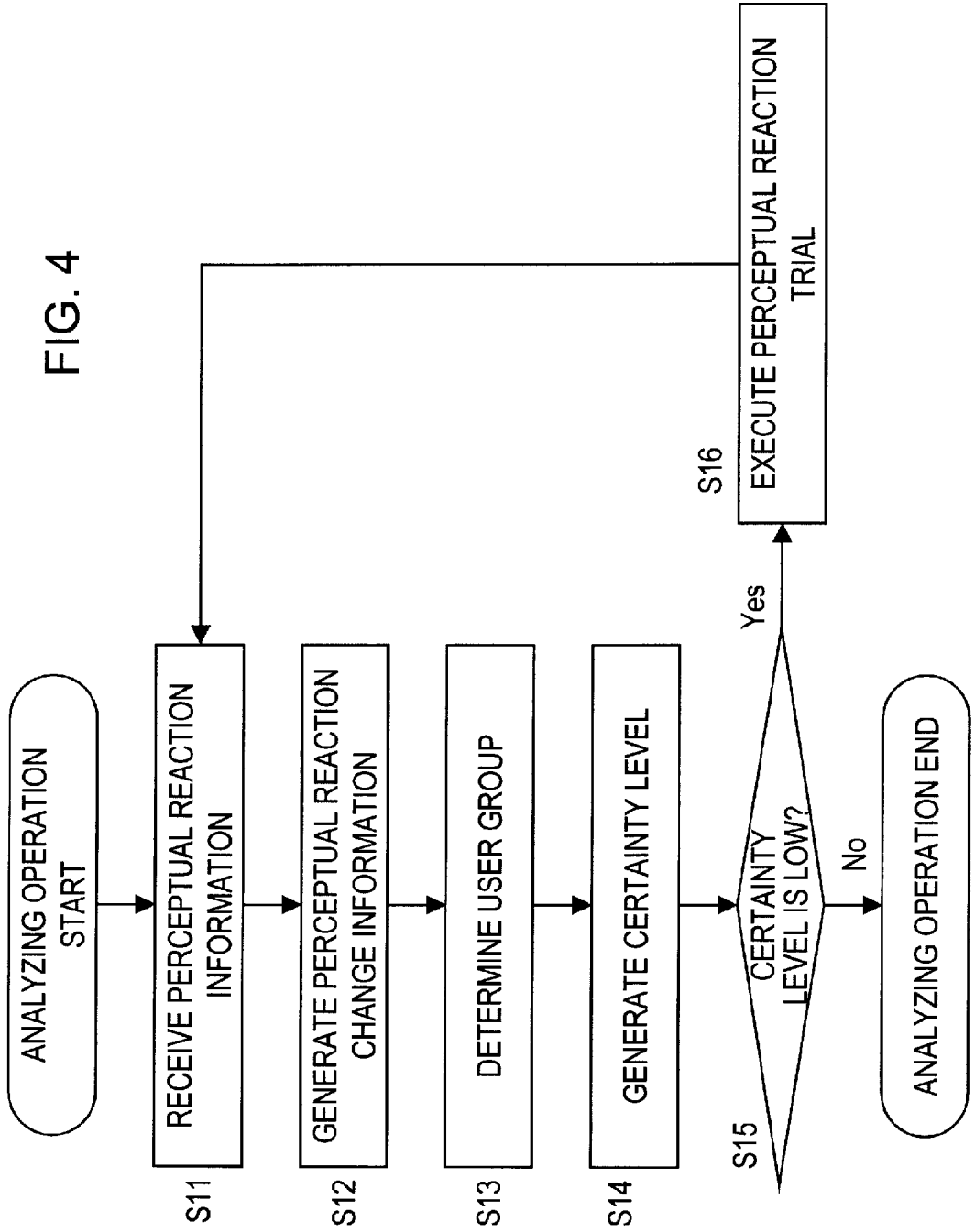
FIG. 4 is a flow chart depicting an analyzing operation of the perceptual reaction analyzer according to this embodiment.

FIG. 4 is a flow chart depicting an analyzing operation of the perceptual reaction analyzer according to this embodiment. The perceptual reaction analyzer 100 executes the perceptual reaction analyzing program to perform the analyzing operation depicted in FIG. 4.

First the perceptual reaction analyzer 100 receives the perceptual reaction information from the terminals CL1 to CLn, and stores the information in the perceptual reaction information table 112 (step S11 in FIG. 4). As mentioned above, the perceptual reaction information from the terminals CL1 to CLn has the emotional perceptual reaction (emotional perceptual reaction information) and the behavioral perceptual reaction (behavioral perceptual reaction information) detected by each terminal.

Examples of the emotional perceptual reaction information are information on whether the user is smiling and information on whether the user look bored.

Examples of the behavioral perceptual reaction information are the distance between the user and the terminal, the sound volume of the content, and the size of the display area of the content. For the behavioral perceptual reaction information, the degree of contact of the content by the user may be calculated by two values for each reaction type, such as whether the distance is close or far, the sound volume is high or low, and the display area is large or small, or the degree of response may be calculated as the contact amount that is normalized between a maximum value and a minimum value for each reaction type. For example, a 1.0 distance between the user and the terminal means the closest distance (e.g. less than 30 cm), and 0.0 thereof means the farthest distance (e.g. 2 m or more), a 1.0 sound volume means a maximum value, and 0.0 sound volume means a minimum value (silence state), and a 1.0 display area means a maximum size (e.g. entire screen size), and 0.0 thereof means a minimum size (e.g. not displayed).

The perceptual reaction information stored in the perceptual reaction information table 112 links the perceptual reaction of the user with the content the user was viewing at that time. Examples are the perceptual reaction information where the perceptual reaction of the user detected at predetermined time intervals is summarized based on the time on the content in a time series during a detection period of the terminal, or the perceptual reaction information where the perceptual reaction of the user detected for each scene of the content is summarized in a time series.

Now the perceptual reaction analyzer 100 generates the perceptual reaction change information based on the perceptual reaction information, and stores the information in the perceptual reaction change information table 113 (step S12 in FIG. 4). The perceptual reaction change information indicates the change (or transformation) of perceptual reaction summarized in a time series. For example, as the perceptual reaction change information, the change of facial expression of the user at each time or at each scene is determined as "interested" (positive) or "not interested" (negative), or the sound volume of the content increased/decreased by the user is digitized in a time series.

After step S12, the perceptual reaction analyzer 100 determines whether the user of each terminal is interested in the content based on the perceptual reaction change information, and classifies the user of each group into a group (user group) corresponding to the determination on interest (step S13 in FIG. 4). The user group is defined in the user group table 115 for each determination. For example, the perceptual reaction analyzer 100 classifies a user who was determined as interested in the content into a positive group, and classifies a user, who was determined as not interested in the content, into a negative group.

Then the perceptual reaction analyzer 100 generates a certainty level of the interest of the user of each terminal based on the perceptual reaction change information (step S14 in FIG. 4). The certainty level is an index to indicate the degree of certainty of the determination when the group the user belongs to is determined in step S13.

An example of an element to determine the certainty level is the data volume, which is used for determining the user group of the user when the user is classified based on the perceptual reaction of the user (step S13 in FIG. 4). The certainty level is low when the perceptual reaction cannot be clearly discerned, and the data volume used for determining the user group is small. Another example of an element to determine the certainty level is a degree of change of the data. If sufficient data cannot be stored not only for the change of the emotional perceptual reaction but also for the change of the behavioral perceptual reaction, then it is difficult to determine whether the user is interested in the content or not, and the certainty level becomes low.

In this embodiment, the certainty level is generated using a support rate and/or a change rate. For example, if only the support rate is used, the certainty level is low when the support rate is lower than a threshold. If only the change rate is used, the certainty level is low when the change rate is lower than a threshold. If both the support rate and the change rate are used, the certainty level may be regarded as high when either one of the support rate and the change rate exceeds a respective threshold, or the certainty level may be regarded as high when both the support rate and the change rate exceeds respective thresholds.

The support rate is expressed by the "data volume based on which interest of a user is determined/total data volume on the user". For example, if a user is classified into a negative group, the support rate is "a data volume that indicates negative emotion/total data volume on this user". In this case, the support rate is low if the ratio of the data volume that indicates the user not having interest is small with respect to the total data volume.

The change rate is expressed by the "|total change of contact amount/number of types of behavioral perceptual reactions|". In other words, the change rate is an average value of the change of the contact amount. For example, if the change of the display area size of the content is −0.3, the change of the sound volume of the content is −0.8 and the change of the distance between the user and the terminal is −0.5 when a user is classed to a negative group, and the change rate is |(−0.3−0.8−0.5)/3|=0.53. In other words, the change rate indicates a degree of change of data (contact amount).

If the generated certainty level is high after step S14 (NO in step S15 in FIG. 4), the perceptual reaction analyzer 100 ends the analyzing operation. As a result, the user group of the user is determined.

If the generated certainty level is low (YES in step S15 in FIG. 4), on the other hand, the perceptual reaction analyzer 100 executes the perceptual reaction trial (step S16 in FIG. 4). The perceptual reaction trial is executed to confirm the degree of certainty about the group the user belongs to, and a trial of performing an operation on the content so that the same result of the interest of a user, of which certainty level is low, is again estimated for this user by the perceptual reaction analyzer 100.

The operation performed by the perceptual reaction analyzer 100 in step S16 is, for example, an operation corresponding to the behavioral perceptual reaction change which most frequently occurred in the group this user belongs to, or an operation corresponding to the behavioral perceptual reaction of which the change of the contact amount is greatest in the group this user belongs to.

The content of the operation corresponding to the behavioral perceptual reaction has been stored in the mechanically executable instruction table 109. After extracting the behavioral perceptual reaction, the perceptual reaction analyzer 100 determines the content of the operation with reference to the mechanically executable instruction table 109.

After executing the perceptual reaction trial in step S16, the perceptual reaction analyzer 100 receives the perceptual reaction information from the terminals CL1 to CLn again (step S11 in FIG. 4). The perceptual reaction analyzer 100 repeats steps S12 to S15, and executes the perceptual reaction trial (step S16 in FIG. 4) again if the certainty level is low in step S15.

By executing the perceptual reaction trial when the certainty level is low like this, the perceptual reaction analyzer 100 determines a user group of the user with a higher certainty level. The perceptual reaction trial may be repeated until the certainty level becomes high, or may be repeated for the number of times that is set as a reference.

Now a first embodiment and a second embodiment will be described as examples of the analyzing operation of the perceptual reaction analyzer 100.

[First Embodiment]

FIG. 5(1) and FIG. 5(2) are an example of perceptual reaction information according to the first embodiment. FIG. 5(1) and FIG. 5(2) are the perceptual reaction information of a user 1 of a terminal CL1 detected with a predetermined time interval (detection period) based on the time of the content (content time). FIG. 5(1) is emotional perceptual reaction information in the content time T0 to T5, and FIG. 5(2) is behavioral perceptual reaction information in the content time T0 to T5.

According to the first embodiment, as the emotional perceptual reaction information, the terminal CL1 detects whether the facial expression is a smile or not in two levels: YES (smile) and NO (not smile), and whether the facial expression is a bored expression or not in two levels: YES (bored expression) and NO (not bored expression). As the behavioral perceptual reaction information, the terminal CL1 detects a distance between the user 1 and the terminal CL1 in two levels: "close" and "far", a display area of the content in three levels: "large", "medium" and "small", and a sound volume of the content in three levels: "high", "medium" and "low".

As FIG. 5(1) and FIG. 5(2) indicate, all the emotional perceptual reactions are NO, which means that the perceptual reaction analyzer 100 is not able to estimate whether the user is interested in the content or not by the emotional perceptual reaction. However the behavioral perceptual reaction changes as time elapses, hence the perceptual reaction analyzer 100 is able to estimate whether the user is interested in the content or not based on the behavioral perceptual reaction.

FIG. 6(1) and FIG. 6(2) are an example of the perceptual reaction change information according to the first embodiment. FIG. 6(1) and FIG. 6(2) are the perceptual reaction change information that the perceptual reaction analyzer 100 generated from the perceptual reaction information in FIG. 5(1) and FIG. 5(2) (step S12 in FIG. 4). FIG. 6(1) is the emotional perceptual reaction change information generated from the emotional perceptual reaction information in FIG. 5(1), and FIG. 6(2) is the behavioral perceptual reaction change information generated from the behavioral perceptual reaction information in FIG. 5(2).

First the perceptual reaction analyzer 100 determines the change of perception reaction from the content time T0 to T1, T1 to T2, T2 to T3 and T4 to T5, for each type of perceptual reaction. In concrete terms, in FIG. 6(1) and FIG. 6(2), the perceptual reaction analyzer 100 determines the change of the perceptual reaction to one of "positive" which indicates that the user is interested in the content, "negative" which indicates that the user is not interested in the content, and "no change" which indicates that the response of the user does not change.

In FIG. 6(1), the emotional perceptual reaction does not change in time T0 to T5, as indicated in FIG. 5(1), so the perceptual reaction analyzer 100 determines all reactions as "no change".

In FIG. 6(2), on the other hand, the distance between the user 1 and the terminal CL1 changes from "close" to "far" in the content time T0 to T1 (FIG. 5(2)), so the perceptual reaction analyzer 100 determines this as a "negative" change. The distance between the user 1 and the terminal CL1 changes from "far" to "close" in the content time T1 to T2 (FIG. 5(2)), so the perceptual reaction analyzer 100 determines this as a "positive" change. The distance between the user 1 and the terminal CL1 changes from "close" to "far" in the content time T4 to T5 (FIG. 5(2)), so the perceptual reaction analyzer 100 determines this as a "negative" change.

The sound volume of the content changes from "high" to "medium" in the content time T0 to T1 (FIG. 5(2)), so the perceptual reaction analyzer 100 determines this as a "negative" change.

The display area of the content is maintained at "medium" in the content time T0 to T5 (FIG. 5(2)), so the perceptual reaction analyzer 100 determines the change of the display area of the content in the content time T0 to T5 as "no change".

Then the perceptual reaction analyzer 100 determines the change of perceptual reaction at each content time for each type of perceptual reaction, and performs a total determination of the change of the perceptual reaction at each content time for the emotional perceptual reaction and the behavioral perceptual reaction respectively.

In FIG. 6(1), the perceptual reaction does not change at each time of the content time T0 to T5, so the perceptual reaction analyzer 100 concludes the total determination as all "determination impossible".

In FIG. 6(2), for the change of the perceptual reaction in the content time T0 to T1, there are two "negative" changes, hence the perceptual reaction analyzer 100 concludes that the total determination is "negative". For the change of the perceptual reaction in the content time T1 to T2, there is one "positive" change, hence the perceptual reaction analyzer 100 concludes that the total determination is "positive". For the change of perception reaction in the content time T4 to T5, there is one "negative" change, hence the perceptual reaction analyzer 100 concludes that the total determination is "negative".

In this way, the perceptual reaction analyzer 100 generates the perceptual reaction change information in FIG. 6(1) and FIG. 6(2) from the perceptual reaction information in FIG. 5(1) and FIG. 5(2).

FIG. 7(1) to FIG. 7(3) are an example of the user group determination process according to the first embodiment. The perceptual reaction analyzer 100 determines the user group based on the perceptual reaction change information in FIG. 6(1) and FIG. 6(2) (step S13 in FIG. 4).

In FIG. 7(1) to FIG. 7(3), using the respective total determination result of the emotional perceptual reaction change information and the behavioral perceptual reaction change information, the perceptual reaction analyzer 100 classifies the user 1 to a user group corresponding to either a "positive" change or "negative" change, of which the number of times is higher.

In concrete terms, based on the emotional perceptual reaction change information of the user 1 in FIG. 6(1), the perceptual reaction analyzer 100 tabulates the number of times of the emotional perceptual reaction change of the user 1 in the content time T0 to T5 as in FIG. 7(1). As a result, there is no "positive" change, there is no "negative" change, and there are five times "determination impossible".

Then based on the behavioral perceptual reaction change information of the user 1 in FIG. 6(2), the perceptual reaction analyzer 100 tabulates the number of times of the behavioral perceptual reaction change of the user 1 in the content time T0 to T5 as in FIG. 7(2). As a result, there is one "positive" change, there are two "negative" changes, and there are two times "determination impossible".

Then the perceptual reaction analyzer 100 totals the result in FIG. 7(1) and the result in FIG. 7(2), and tabulates a total number of times of the perceptual reaction changes of the user 1 in the content time T0 to T5 as in FIG. 7(3). As a result, there is one "positive" change, there are two "negative" changes, and there are seven times "determination impossible". This means that the user 1 presented more "negative" changes in the content time T0 to T5. Therefore the perceptual reaction analyzer 100 classifies the user 1 to the negative group.

In this way, even if the emotional perceptual reaction is not detected, the perceptual reaction analyzer 100 is able to determine a user group which the user of each terminal belongs to by the behavioral perceptual reaction.

As described in FIG. 4, the perceptual reaction analyzer 100 generates the certainty level after the user group is determined (step S14 in FIG. 4). In FIG. 7(1) to FIG. 7(3), the support rate determines whether the certainty level is high or low.

The support rate is expressed by the "data volume based on which interest of a user is determined/total data volume on the user". Therefore in FIG. 7(1) to FIG. 7(3), the support rate of the user 1 is the "data volume that indicates no interest (negative)/total data volume of this user=2/10=0.2". If the certainty level is regarded as low when the support rate is less than a threshold 0.4, then the perceptual reaction analyzer 100 determines that the certainty level of the classification of the user 1 to the negative group is low.

Figure 8:
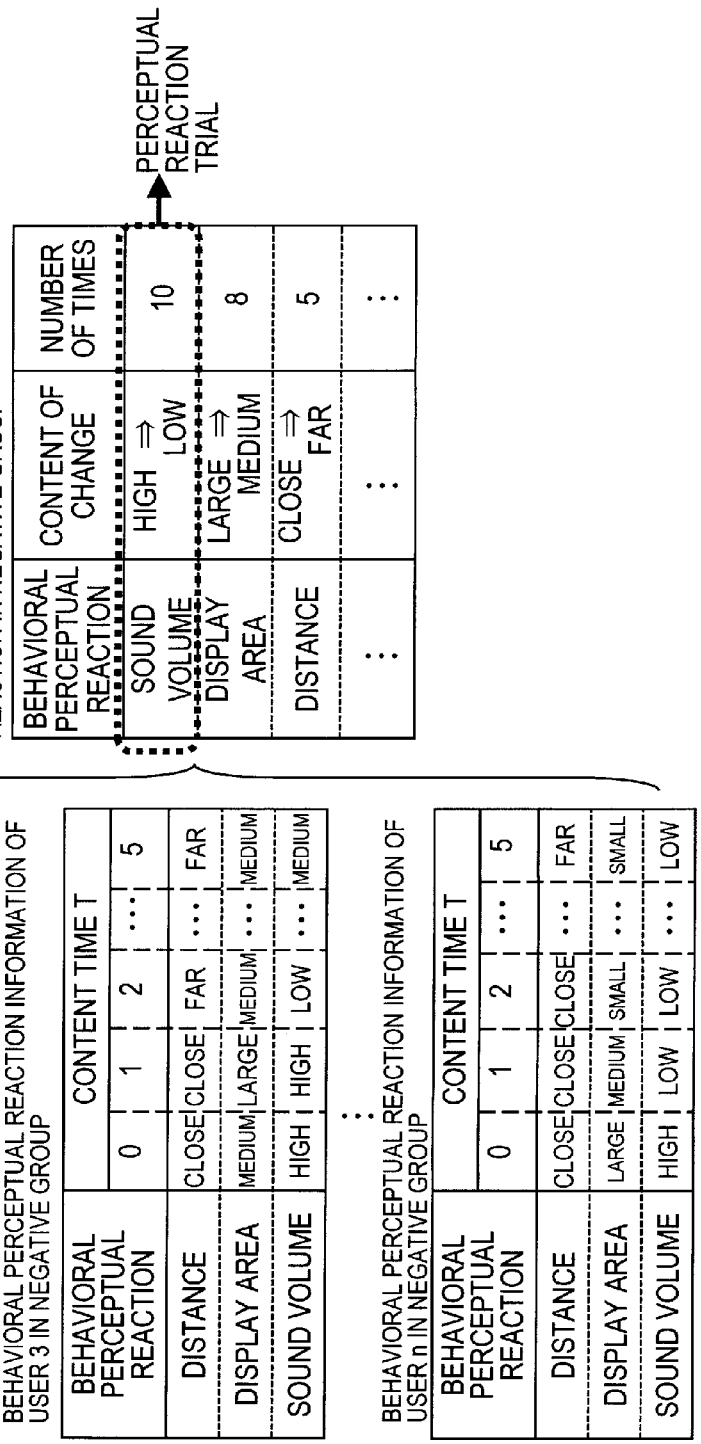
FIG. 8 is an example of a process to determine the operation content of the perceptual reaction trial according to the first embodiment.

FIG. 8 is an example of a process to determine the operation content of the perceptual reaction trial according to the first embodiment. The perceptual reaction analyzer 100 executes the perceptual reaction trial for a user of which the certainty level is low (step S16 in FIG. 4).

In FIG. 8, the perceptual reaction analyzer 100 detects the behavioral perceptual reaction change which most frequently occurred, based on the behavioral perceptual reaction information of the user 1 of which the certainty level was determined to be low in FIG. 7(1) to FIG. 7(3), and the behavioral perceptual reaction information of another user of the negative group which the user 1 belongs to. Then with reference to the mechanically executable instruction table 119, the perceptual reaction analyzer 100 determines the operation corresponding to the behavioral perceptual reaction as the perceptual reaction trial operation.

Thereby as the perceptual reaction trial, the perceptual reaction analyzer 100 performs an operation corresponding to the behavioral perceptual reaction which was most frequently detected in the negative group which the user 1 belongs to, and determines whether the user 1 accepts the behavioral perceptual reaction, so that if the user 1 is interested in the content or not is able to be estimated with a higher certainty level.

In concrete terms, the perceptual reaction analyzer 100 confirms the content of the change of the behavioral perceptual reaction at each content time, based on the behavioral perceptual reaction information of each user of the negative group detected during the content time T=0 to 5, and tabulates the number of times of changes for each behavioral perceptive reaction, as in the tabulation result R1 in FIG. 8. As a result, the perceptual reaction analyzer 100 detects the change of the behavioral perceptual reaction that most frequently occurred is changing the sound volume of the content from "high" to "low", which occurred 10 times.

Then with reference to the mechanically executable instruction table 119, the perceptual reaction analyzer 100 reads the operation corresponding to the behavioral perceptual reaction of changing the sound volume of the content from "high" to "low".

FIG. 9 is an example of the mechanically executable instruction table according to the first embodiment. The mechanically executable instruction table stores the operations that correspond to the behavioral perceptual reaction that the perceptual reaction analyzer 100 executes for the perceptual reaction trial.

Depending on the change of the behavioral perceptual reaction that most frequently occurred, the perceptual reaction analyzer 100 may not be able to directly generate the change in some cases. For example, if the change of the behavioral perceptual reaction that most frequently occurred is the behavioral perceptual reaction of changing the distance between the user and the terminal from "close to "far", then the perceptual reaction analyzer 100 must move itself, and changing the distance between the user and the terminal from "close" to "far" by directly manipulating the distance is difficult.

However in terms of the degree of contact of the content by the user, changing the distance between the user and the terminal from "close" to "far" is equivalent to changing the display area size of the content from "large" to "small". See FIG. 9.

The perceptual reaction analyzer 100 reads an operation corresponding to the most frequently occurred behavioral perceptual reaction from the mechanically executable instruction table 119, and determines the operation of the perceptual reaction trial.

Therefore after detecting the change of the behavioral perceptual reaction of changing the sound volume of the content from "high" to "low" in FIG. 8, the perceptual reaction analyzer 100 determines "the operation to change the sound volume of the content from 'high' to 'low'" as the operation of the perceptual reaction trial for the user 1.

Then the perceptual reaction analyzer 100 executes the operation determined as above for the user 1 as the perceptual reaction trial, receives the perceptual information in the next detection period again from each terminal in the same manner as FIG. 5(1) and FIG. 5(2) to FIG. 7(1) to FIG. 7(3), estimates the interest of each user, and generates the certainty level (S11 to S14 in FIG. 4).

As described above, according to the first embodiment, the perceptual reaction analyzer 100 generates the perceptual reaction change information of each user by determining the change of the perceptual reactions as negative or positive in a time series, based on the received perceptual reaction information of each user.

Then based on the generated perceptual reaction change information of each user, the perceptual reaction analyzer 100 classifies each user to a user group that corresponds to the negative change or the positive change whichever has occurred more frequently. Then the perceptual reaction analyzer 100 generates a support rate for the classification of each user to a user group using the support rate as the certainty level.

If the support rate is lower than a threshold, the operation of the content that corresponds to the behavioral perceptual reaction of which change was detected most frequently, among the behavioral perceptual reactions of all the users of the user group which this user belongs to, is executed as the perceptual reaction trial, so as to estimate whether this user is interested in the content or not.

[Second Embodiment]

FIG. 10 is an example of perceptual reaction information and perceptual reaction change information according to the second embodiment. FIG. 10 is the perceptual reaction information of a user 1 to a user n, and the perceptual reaction change information generated based on the perceptual reaction information. According to the second embodiment, the emotional perceptual reaction is not detected, and only behavioral perceptual reaction is detected just like the first embodiment.

Further, according to the second embodiment, each terminal calculates the behavioral perceptual reaction information as a contact amount. The perceptual reaction analyzer 100 calculates the behavioral perceptual reaction change information as the change of the contact amount based on the behavioral perceptual reaction information received from each terminal.

For example, in the case of the user 1, the distance between the user and the terminal changed from "0.6" to "0.3" in the content time T0 to T1 in the behavioral perceptual reaction information, hence then change amount thereof is "−0.3" in the behavioral perceptual reaction change information. The sound volume was changed from "0.9" to "0.7" in the content time T0 to T1, hence the change amount thereof is "−0.2".

Further, the distance between the user and the terminal changed from "0.3" to "0.7" in the content time T1 to T2, hence the change amount thereof is "0.4", and the display area of the content changed from "0.6" to "0.7", hence the change amount thereof is "0.1".

In this way, according to the second embodiment, the perceptual reaction analyzer 100 determines the change of each type of behavioral perceptual reaction in each content time by the change amount of the contact amount, as the behavioral perceptual reaction change information.

FIG. 11 is an example of the process to determine a user group according to the second embodiment. After generating the behavioral perceptual reaction change information of each user using the change of contact as in FIG. 10 (step S12 in FIG. 4), the perceptual reaction analyzer 100 classifies each user to a user group.

In concrete terms, the perceptual reaction analyzer 100 tabulates the change of contact amount of each user respectively, regarding an increase in the contact amount as a positive change, and a decrease in the contact amount as a negative change.

For example, in the case of the user 1, distance is increased by "0.4" and the display area of the content is increased by "0.1", in the content time T1 to T2, so the positive change amount of the user 1 is 0.1+0.4=0.5. In the same manner, the negative change amount of the user 1 is (−0.3)+(−0.2)+(−0.4)=−0.9.

In the case of user 2, on the other hand, the positive change amount is 0.9 and the negative change amount is −0.2 in the same manner. And in the case of user n as well, the positive change amount is 0.0 and the negative change amount if −1.8.

After tabulating the change of contact amount of each user, the perceptual reaction analyzer 100 compares the positive change amount and the negative change amount, and classifies each user to a user group that corresponds to the greater value of the change amount. Therefore in FIG. 11, the user 1 is classified into the negative group, the user 2 is classified into the positive group, and the user n is classified into the negative group.

In this way, even if the emotional perceptual reaction is not detected, the perceptual reaction analyzer 100 is able to determine a user group which the user of each terminal belongs to by the behavioral perceptual reaction.

Here as described in FIG. 4, the perceptual reaction analyzer 100 generates the certainty level after the user group is determined (step S14 in FIG. 4). In FIG. 11, the change rate determines whether the certainty level is high or low.

The change rate is expressed by "|total change of contact amount/number of types of behavioral perceptual reaction|". Therefore in FIG. 11, the change rate on the user 1 is |{0.5+(−0.9)}/3|=|−0.13|=0.13. In the same manner, the change rates of the user 2 and the user n are 0.23 and 0.6 respectively.

If the certainty level is regarded as low when the change rate is less than a threshold 0.2, then the perceptual reaction analyzer 100 determines that the certainty level of classification of the user 1 to the negative group is low. The perceptual reaction analyzer 100 determines that the certainty level of the classification of the user 2 to the positive group and the certainty level of the user n to the negative group are high respectively. Therefore the perceptual reaction analyzer 100 executes the perceptual reaction trial for the user 1 (step S16 in FIG. 4).

Figure 12:
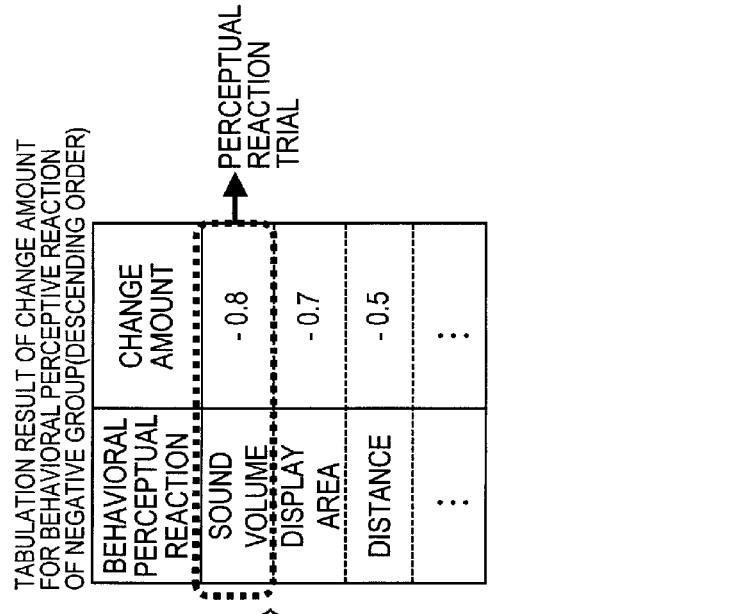
FIG. 12 is an example of a process to determine the operation content of the perceptual reaction trial according to the second embodiment.

FIG. 12 is an example of a process to determine the operation content of the perceptual reaction trial according to the second embodiment. FIG. 12 is the process to determine the operation content of the perceptual reaction trial for the user 1 for which the certainty level was determined as low in FIG. 11.

In FIG. 12, the perceptual reaction analyzer 100 detects the behavioral perceptual reaction of which negative change amount is highest in the content time T=0 to 5 based on the behavioral perceptual reaction information of the user 1 and the behavioral perceptual reaction information of other users in the negative group which the user 1 belongs to. Then with reference to the mechanically executable instruction table 119 (FIG. 9), the perceptual reaction analyzer 100 determines the operation that corresponds to the behavioral perceptual reaction as the operation of the perceptual reaction trial.

In concrete terms, the perceptual reaction analyzer 100 detects that the change amount "−0.8" of the behavioral perceptual reaction of decreasing the sound volume of the content is the highest in the content time T=0 to 5. Therefore with reference to the mechanically executable instruction table 119, the perceptual reaction analyzer 100 determines the "operation of decreasing the sound volume of the content as time elapses" as the operation of the perceptual reaction trial for the user 1.

Then the perceptual reaction analyzer 100 executes the operation determined as above for the user 1 as the perceptual reaction trial, receives the perceptual reaction information again from each terminal in the same manner as FIG. 10 and FIG. 11, estimates whether each user is interested in the content or not, and generates the certainty level (S11 to S14 in FIG. 4).

Figure 13:
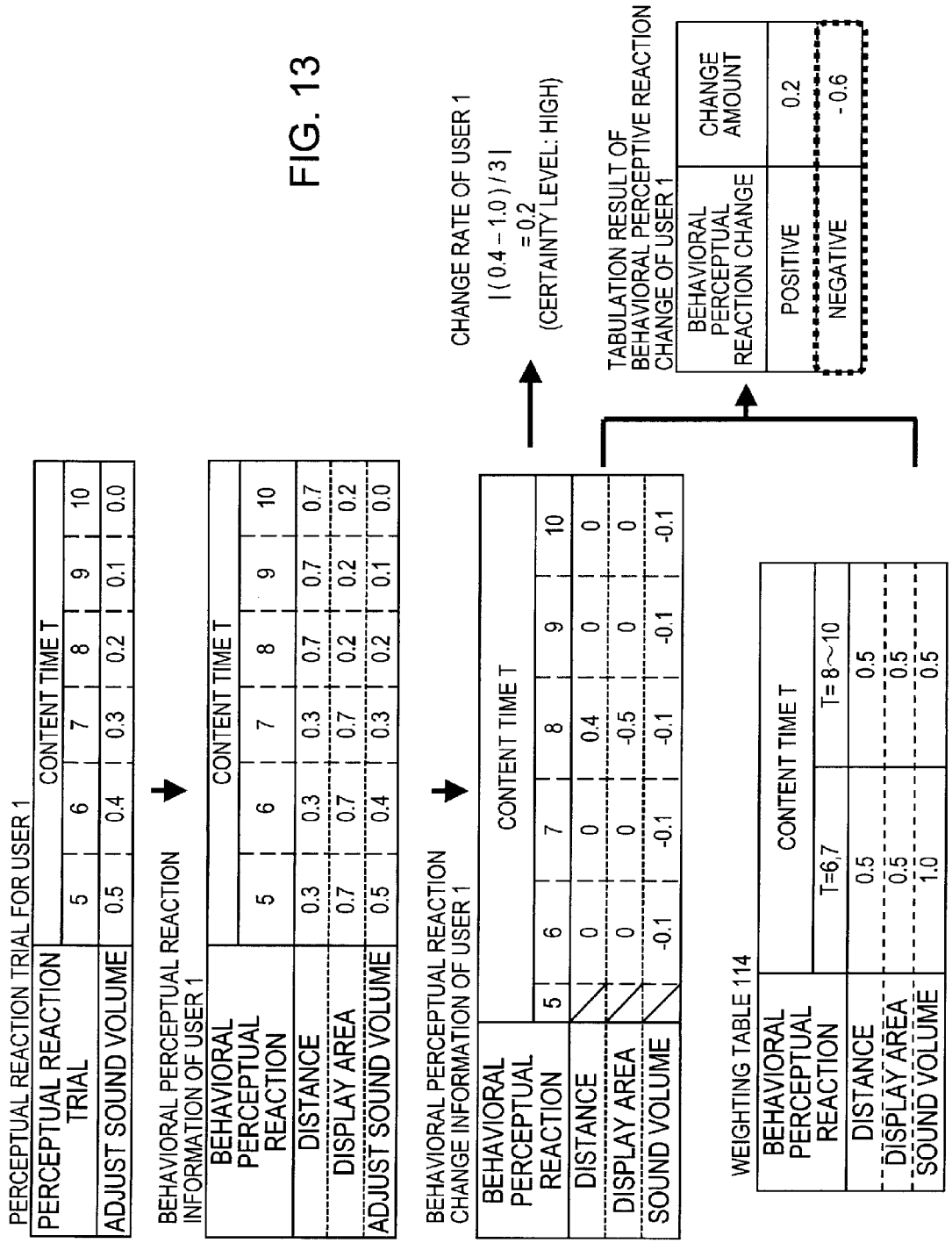
FIG. 13 is a first example of evaluating perceptual reaction with respect to the perceptual reaction trial according to the second embodiment.

FIG. 13 is a first example of evaluating perceptual reaction with respect to the perceptual reaction trial according to the second embodiment.

The behavioral perceptual reaction information of the user 1 in FIG. 13 is a result of detection by the terminal CL1 in content time T5 to T10 when the perceptual reaction analyzer 100 executed the perceptual reaction trial determined in FIG. 12 by decreasing the sound volume of the content by 0.1 at a time from the time T5 as the perceptual reaction trial for the user 1 in FIG. 13.

After the perceptual reaction trial, the perceptual reaction analyzer 100 receives perceptual reaction information from each terminal, and generates perceptual reaction change information (steps S11 and S12 in FIG. 4). Then the perceptual reaction analyzer 100 determines a user group for the user 1 based on the perceptual reaction change information on the perceptual reaction trial for the user 1 (step S13 in FIG. 4).

When a user group is determined here, the perceptual reaction analyzer 100 may weight the change of contact amount of the behavioral perceptual reaction change information not as in FIG. 11 but as in FIG. 13. This is because the behavioral perception reaction information detected in the content time period immediately after executing the perceptual reaction trial may clearly indicate whether the user 1 is interested in the content or not. For example, if the user 1 is interested in the content, the user 1 may notice that the sound volume is lower in an early time period after the start of the perceptual reaction trial, and respond with a positive behavioral perceptual reaction.

The perceptual reaction analyzer 100 refers to a weighting table 114 after generating the behavioral perceptual reaction change information, and determines a product of the change of the contact amount at each content time and a coefficient of the weighting table 114, and tabulates the change of contact amount after the weighting for positive change and negative change respectively.

In the weighting table 114 in FIG. 13, the coefficients with respect to the change of the contact amount regarding to sound volume are set to 1.0 in the content time T5 to T6 and T6 to T7, which are two blocks immediately after the start of the perceptual reaction trial, and the coefficients with respect to the change of the contact amount in the other content time periods are set to 0.5.

For the behavioral perception reaction change information of the user 1, the distance between the user 1 and the terminal CL1 changes from "0.3" to "0.7", and the display area of the content changes from "0.7" to "0.2" in the content time T7 to T8. The user 1 does not respond by increasing the sound volume although the sound volume is decreased by 0.1 at a time in the content time T5 to T10 by the perceptual reaction trial. In other words, the user 1 accepts the negative change of the perceptual reaction that another user in the negative group responded with.

Therefore the positive change amount of the user 1 is 0.4×0.5=0.2, and the negative amount of the user 1 is (−0.1)× 1.0+(−0.1)×1.0+(−0.1)×0.5+(−0.1)×0.5×(−0.1)×0.5+(−0.5)× 0.5=−0.6. As a result, the user 1 is classified into the negative group since the negative change amount is greater than the positive change amount.

In this case, the change rate of the user 1 is |{0.4+(−0.1)× 5+(−0.5)}/3|=|−0.2|=0.2, hence it is determined that the certainty level is high. As a result, the perceptual reaction analyzer 100 determines a user group of the user 1 as the negative group, and determines that the user 1 is not interested in the content.

In this way, in FIG. 13, the perceptual reaction analyzer 100 not only increases the certainty level by the perceptual reaction trial, but also multiplies the change of the perceptual reaction immediately after the perceptual reaction trial by a coefficient for weighting, so that the reaction of the user to the perceptual reaction trial is reflected in the calculation with priority.

Figure 14:
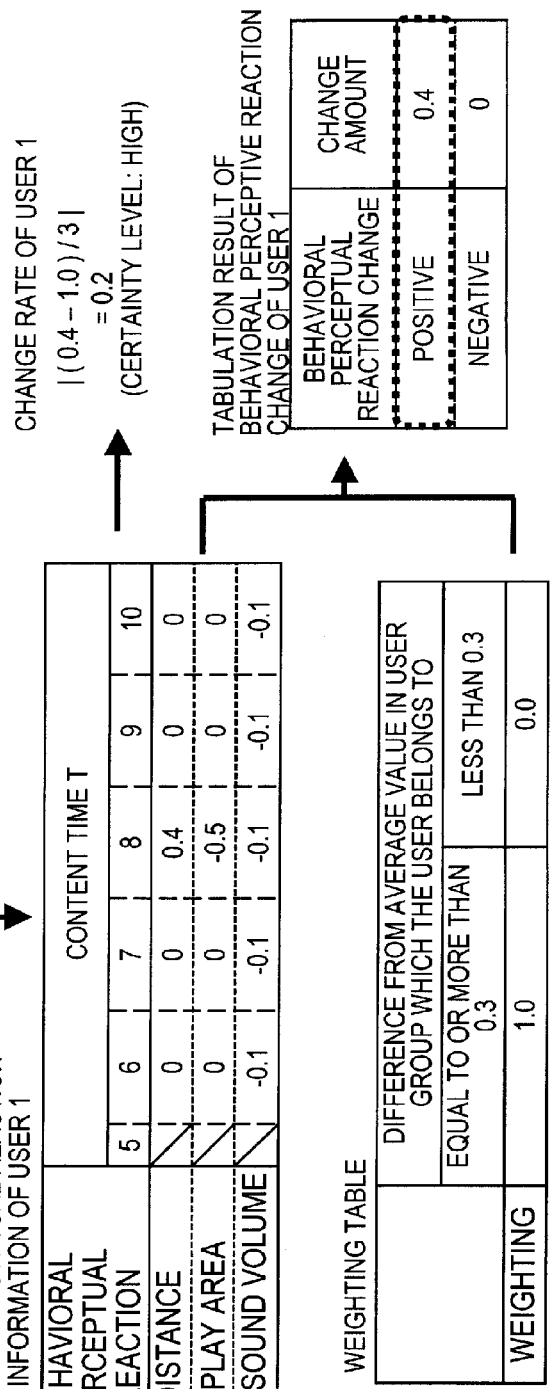
FIG. 14 is a second example of evaluating perceptual reaction after executing the perceptual reaction trial according to the second embodiment.

FIG. 14 is a second example of evaluating perceptual reaction after executing the perceptual reaction trial according to the second embodiment. When a user group of the user 1 is determined based on the perceptual reaction change information after executing the perceptual reaction trial for the user 1 determined in FIG. 12, the perceptual reaction analyzer 100 may perform weighting not as in FIG. 11 or FIG. 13 but as in FIG. 14, based on the difference between an average value of the contact amounts by the user group which the user 1 belongs to and the contact amount by the user 1. Thereby the perceptual reaction analyzer 100 is able to estimate whether the user 1 is interested in the content with respect to the perceptual response trial, while enhancing the perceptual reaction change that deviated from the average in the user group which the user 1 belongs to.

The behavioral perceptual reaction information of the user 1 in FIG. 14 is a result of detection by the terminal CL1 at content time T5 to T10 when the perceptual reaction analyzer 100 executed the operation determined in FIG. 12, by decreasing the sound volume of the content by 0.1 at a time from the content time T5 as the perceptual reaction trial for the user 1. A value in parentheses below a contact amount is a difference between an average value of contact amounts in the negative group and a contact amount by the user 1 at each content time.

In concrete terms, in the content time T7 to T8, the distance between the user 1 and the terminal CL1 changes from "0.3" to "0.7", and the difference of the distance "0.7" at the content time T8 from the average value of the negative group is "0.3". The display area of the content changes from "0.7" to "0.2" in the content time T7 to T8, and the difference from the average value of the negative group is "0.2" at the content time T8. The user 1 does not respond with increasing the sound volume although the sound volume is decreased by 0.1 at a time within content time T5 to T10 by the perceptual reaction trial. In other words, the user 1 accepts the negative change of the perceptual reaction that another user in the negative group responded with.

The perceptual reaction analyzer 100 refers to the weighting table 114 after generating the behavioral perceptual reaction change information, determines a product of the change of the contact amount at each content time and a coefficient of the weighting table 114, and tabulates the change of the contact amount after weighting for positive change and negative change respectively. By performing this weighting, the perceptual reaction analyzer 100 is able to estimate whether the user 1 is interested in the content of the perceptual response trial, by enhancing the perceptual reaction change that deviated from the average value in the user group which the user 1 belongs to.

In the weighting table 114 in FIG. 14, the coefficients with respect to the change of contact amount, of which the difference from the average value of the contact amounts in the negative group is 0.3 or more, are set to 1.0, and the coefficients with respect to the change of the contact amount, of which the difference from the average value of the contact amounts in the negative group is less than 0.3, are set to 0.0.

Therefore the positive change amount of the user 1 is 0.4×1.0=0.4, and the negative change amount of the user 1 is (−0.1)×0.0×5+(−0.5) ×0.0=0.0. As a result, the user 1 is classified into the positive group since the positive change amount is greater than the negative change amount. In other words, in FIG. 14, the user 1 is classified into the positive group with enhancing the perceptual reaction change of the user 1, moving closer to the terminal, which deviated from the mean value of the negative group in content time T7 to T8.

In this case, the change rate of the user 1 is |{0.4+(−0.1)× 5+(−0.5)}/3|=|−0.2|=0.2, hence it is determined that the certainty level is high. As a result, the perceptual reaction analyzer 100 determines a user group of the user 1 as the positive group, and determines that the user 1 is interested in the content.

In this way, in FIG. 14, the perceptual reaction analyzer 100 not only increases the certainty level by the perceptual reaction trial, but also multiplies the change of the perceptual reaction immediately after the perceptual reaction trial by a coefficient for weighting so that it is estimated whether the user 1 is interested in the content with respect to the perceptual response trial, with enhancing the perceptual reaction change that deviated from the average value in the user group which the user 1 belongs to.

A value in parentheses under a contact amount in the behavioral perceptual reaction information of the user 1 in FIG. 14 may be a difference between an average value of contact amounts in the negative group, and a contact amount by the user 1 at each scene of the content. For example, if the content is constituted by three scenes: a beginning phase, a middle phase and a final phase, and the content time T0 to T5 is included in the beginning phase of the content, then the difference between the average value of the contact amounts in the negative group in the beginning phase of the content and the contact amount by the user 1 may be used.

A web camera of the perceptual reaction detector 208 may detect a position of the line of sight of the user with respect to the display of the output device 204 of the terminal CL, and based on this detection result, the perceptual reaction analyzer 100 may control whether weighting is performed on the change of the contact amount of the behavioral perceptual reaction change information or not. For example, if the line of sight of the user is on the content, the change of contact amount is weighted. If the line of sight of the user is not on the content, on the other hand, the change of the contact amount is not weighted.

As described above, according to the second embodiment, the perceptual reaction analyzer 100 generates the perceptual reaction change information of each user by generating the change of the contact change amount in a time series, based on the received perceptual reaction information of each user.

Then based on the generated perceptual reaction change information, the perceptual reaction analyzer 100 classifies the user into a negative group if the decrease in the contact amount is greater than the increase in the contact amount, and classifies the user into a positive group if the increase in the contact amount is greater than the decrease in the contact amount.

If the change rate is lower than a threshold, the operation on the content that corresponds to a type of the behavioral perceptual reaction of which change of contact amount of the content is greater among the perceptual reactions of all the users in the same group which the user belongs to, is executed as the perceptual reaction trial, so as to estimate whether this user is interested in the content or not.

[Third Embodiment]

The perceptual reaction analyzer 100 may not only estimate the presence/absence of the interest for each user as in the third embodiment, but also estimate the presence/absence of the interest in the content for each attribute based on the received perceptual reaction information of each user and the attributes of the user. The attributes are, for example, age, gender and affiliation of the user. An operation of the perceptual reaction analyzer will now be described with reference to FIG. 15 and FIG. 16, using a sales or business office as an example of an attribute.

FIG. 15 is a flow chart depicting an analyzing operation by the perceptual reaction analyzer according to the third embodiment. FIG. 16 is an example of a process to determine a user group according to the third embodiment. FIG. 16 indicates a process in which the perceptual reaction analyzer 100 receives the perceptual reaction information of the users A1 to A10, B1 to B20 and C1 to C30 belonging to sales offices A to C respectively, and determines a user group for each sales office A to C.

First the perceptual reaction analyzer 100 receives the perceptual reaction information from each user of the sales offices A to C (step S21 in FIG. 15).

Then just like the first embodiment, the perceptual reaction analyzer 100 tabulates the number of times of positive change and the number of times of negative change for each user based on the received perceptual reaction information, and determines a user group respectively (step S22 in FIG. 15). In concrete terms, the perceptual reaction analyzer 100 determines a user group for each user based on the perceptual reaction information of users A1 to A10, B1 to B20 and C1 to C30. As a result, the users A1, B20, C1, C30 or the like are classified into the negative group, and the users A1, B1 or the like are classified into the positive group, for example.

After step S22, the perceptual reaction analyzer 100 tabulates the number of times of positive change and the number of times of negative change for each attribute, and determines a user group for each attribute in the same manner as S22 (step S23 in FIG. 15).

When a user group of the sales office A is determined, for example, the perceptual reaction analyzer 100 tabulates the number of times of positive change, the number of times of negative change, and the number of times of "determination impossible" for each user A1 to A10 based on the perceptual reaction change information of users A1 to A10, and generates the tabulation result Ra of all the perceptual reaction changes of sales office A. As a result, there are ten times of "positive" change, twenty times of "negative" change, and seventy times of "determination impossible". This means that "negative" change occurred more frequently in sales office A.

Therefore the perceptual reaction analyzer 100 classifies sales office A into the negative group.

The perceptual reaction analyzer 100 generates tabulation results Rb and Re for sales office B and sales office C in the same manner, and classifies sales office B to the positive group and sales office C to the negative group based on the respective results.

After step S23, the perceptual reaction analyzer 100 generates the certainty level for each attribute in the same manner as the first embodiment (step S24 in FIG. 15). In the case of sales office A, for example, the support rate is the data volume that indicates negative emotion/total data volume of the user=20/100=0.20. If the certainty level is regarded as low when the support rate is less than a threshold 0.4, then the perceptual reaction analyzer 100 determines the certainty level of classifying sales office A into the negative group as low.

In the same manner, the perceptual reaction analyzer 100 calculates the support rate for sales office B and sales office C, which are 0.45 and 0.41 respectively, and determines that the certainty level as high for both cases.

If the certainty level generated in step S24 is low (YES in step S25 in FIG. 15), the perceptual reaction analyzer 100 executes the perceptual reaction trial (step S26 in FIG. 15).

In concrete terms, the perceptual reaction analyzer 100 detects a behavioral perceptual reaction change that occurred most frequently in the same manner as FIG. 8, based on the perceptual reaction information of the users A1, B20, C1, C30 or the like who belong to the same negative group as sales office A, of which certainty level is low. Then the perceptual reaction analyzer 100 determines the operation that corresponds to the behavioral perceptual reaction as the operation of the perceptual reaction trial with reference to the mechanically executable instruction table 119. Then the perceptual reaction analyzer 100 executes the determined operation for the users A1 to A10 belonging to sales office A as the perceptual reaction trial.

In other words, in step S26, the perceptual reaction analyzer 100 determines the operation content of the perceptual reaction trial based on the perceptual reaction information of all the users belonging to the same user group as the user group of the attribute of which certainty level is low. Then the perceptual reaction analyzer 100 executes the determined operation for all the users having this attribute as the perceptual reaction trial.

In this way, according to the third embodiment, the perceptual reaction analyzer 100 estimates the presence/absence of the interest of the user about the content for each attribute, based on the received perceptual reaction information of each user and the attributes of the user. If the certainty level is low, the perceptual reaction analyzer 100 executes again the perceptual reaction trial for all users having this attribute, based on the perceptual reaction information of the users belonging to the same user group as the user group of this attribute. As a result, the perceptual reaction analyzer 100 is able to estimate the presence/absence of the interest in the content for each attribute with a higher certainty level.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A perceptual reaction analyzer that transmits content to a plurality of terminals connected via a network and estimates presence/absence of interest of users of the plurality of terminals, based on perceptual reaction information generated by each of the terminals detecting perceptual reaction of the user of the terminal on the content for a predetermined period, the perceptual reaction analyzer comprising:
   a content transmitting unit configured to perform a content transmitting processing to transmit content to the terminals;
   a perceptual reaction information receiving unit configured to perform a perceptual reaction information receiving processing to receive the perceptual reaction information detected by each of the plurality of terminals;
   a perceptual reaction change generating unit configured to perform a perceptual reaction change information generating processing to generate perceptual reaction change information which indicates a change of perceptual reaction of the users of the plurality of terminals based on the received perceptual reaction information;
   a user grouping unit configured to perform a user grouping processing to estimate the presence/absence of interest of the users of the plurality of terminals based on the perceptual reaction change information, and classify the users into groups corresponding to the presence/absence of the interest;
   a certainty level generating unit configured to perform a certainty level generating processing to generate a certainty level which indicates a degree of certainty of the presence/absence of interest estimated for each user based on the perceptual reaction change information; and
   a perceptual reaction trial unit configured to perform a perceptual reaction trial processing to try, for a low certainty user of which certainty level is lower than a threshold, an operation on the content corresponding to the perceptual reaction by which the same presence/absence of interest of the low certainty user is estimated again, based on the perceptual reaction information of a user of which presence/absence of interest is the same as the low certainty user, wherein
   the perceptual reaction information receiving processing, the perceptual reaction change information generating processing and the user grouping processing are performed after the perceptual reaction trial processing, such that interest re-estimating processing to estimate the presence/absence of interest of the low certainty user with respect to the tried operation is performed.

2. The perceptual reaction analyzer according to claim 1, wherein
   the certainty level generating processing is performed after the interest re-estimating processing is performed, and the perceptual reaction trial processing and the interest re-estimating processing are repeated again when the certainty level of the low certainty user is lower than the threshold.

3. The perceptual reaction analyzer according to claim 1, wherein
   in the perceptual reaction change information generating processing, the perceptual reaction change information is generated by determining the change of the perceptual reaction as either a negative change or a positive change in a time series, and
   in the user grouping processing, the user is classified into a group corresponding to the negative change or the positive change whichever has occurred the higher number of times, based on the perceptual reaction change information.

4. The perceptual reaction analyzer according to claim 3, wherein
   the certainty level is a ratio of the number of times of the negative change or the positive change whichever is higher, with respect to the predetermined period.

5. The perceptual reaction analyzer according to claim 3, wherein
   in the perceptual reaction trial processing, the content is operated so that the low certainty user performs a type of perceptual reaction detected most frequently among the perceptual reactions of a user belonging to the same group as the low certainty user.

6. The perceptual reaction analyzer according to claim 1, wherein
   in the perceptual reaction change information generating processing, perceptual reaction change information is generated by calculating the change of a contact amount by the user on the content in a time series, and
   in the user grouping processing, the user is classified into a negative group when the contact amount decreases and is classified into a positive group when the contact amount increases, based on the perceptual reaction change information.

7. The perceptual reaction analyzer according to claim 6, wherein
   the certainty level is an average value of the change of the contact amount for each type of perceptual reaction of the user.

8. The perceptual reaction analyzer according to claim 6, wherein
   in the perceptual reaction trial processing, the content is operated so that the low certainty user performs a type of perceptual reaction of which change of contact amount on the content is greatest among the perceptual reactions of a user belonging to the same group as the low certainty user.

9. The perceptual reaction analyzer according to claim 6, wherein
   in the user grouping processing after the content is operated in the perceptual reaction trial processing, the change of contact amount by the user on the operated content is weighted according to the operation, and the user is classified into the negative group or the positive group based on the weighted change of the contact amount.

10. The perceptual reaction analyzer according to claim 6, wherein
    in the user grouping processing after the content is operated in the perceptual reaction trial processing, the change of contact amount by the low certainty user on the operated content is weighted according to a difference between the contact amount by the low certainty user and an average value of the contact amount by users belonging to the same group as the low certainty user, and the low certainty user is classified into the negative group or the positive group based on the weighted change of the contact amount.

11. The perceptual reaction analyzer according to claim 1, wherein
    the perceptual reaction information includes at least one of reaction concerning a distance between the terminal and the user of the terminal, reaction concerning a size of a display area of the content on the terminal, and reaction concerning a sound volume of the content on the terminal.

12. The perceptual reaction analyzer according to claim 1, wherein
in the perceptual reaction trial processing, at least one of sound volume adjusting processing to increase/decrease a sound volume of the content on the terminal, and display area adjusting processing to expand/reduce a display area of the content on the terminal is executed, based on the perceptual reaction information of a user of which presence/absence of interest is the same as the low certainty user.

13. The perceptual reaction analyzer according to claim 1, wherein
the user grouping unit performs attribute grouping processing to estimate the presence/absence of interest of attributes of the users of the plurality of terminals based on the perceptual reaction change information and classifies the attributes into groups corresponding to the presence/absence of the interest,
the certainty level generating unit performs attribute certainty level generating processing to generate an attribute certainty level that indicates a degree of certainty of the presence/absence of interest estimated for each of the attributes based on the perceptual reaction change information, and
the perceptual reaction trial unit performs attribute perceptual reaction trial processing to try, for a user having a low certainty attribute with the attribute certainty level that is lower than the threshold, an operation on the content corresponding to the perceptual reaction by which the same presence/absence of interest as the low certainty attribute is estimated again, based on the perceptual reaction information of a user of which presence/absence of interest is the same as the low certainty attribute.

14. A perceptual reaction analyzing method for a perceptual reaction analyzer that transmits content to a plurality of terminals connected via a network and estimates presence/absence of interest of users of the plurality of terminals, based on perceptual reaction information generated by each of the terminals detecting perceptual reaction of the user of the terminal on the content for a predetermined period, the perceptual reaction analyzing method comprising:
a content transmitting processing by the perceptual reaction analyzer to transmit content to the terminals;
a perceptual reaction information receiving processing by the perceptual reaction analyzer to receive perceptual reaction information detected by each of the plurality of terminals;
a perceptual reaction change information generating processing by the perceptual reaction analyzer to generate perceptual reaction change information which indicates a change of perceptual reaction of the users of the plurality of terminals based on the received perceptual reaction information;
a user grouping processing by the perceptual reaction analyzer to estimate the presence/absence of interest of the users of the plurality of terminals based on the perceptual reaction change information, and classify the users into groups corresponding to the presence/absence of the interest;
a certainty level generating processing by the perceptual reaction analyzer to generate a certainty level which indicates a degree of certainty of the presence/absence of interest estimated for each user based on the perceptual reaction change information;
a perceptual reaction trial processing by the perceptual reaction analyzer to try, for a low certainty user of which certainty level is lower than a threshold, an operation on the content corresponding to the perceptual reaction by which the same presence/absence of interest of the low certainty user is estimated again, based on the perceptual reaction information of a user of which presence/absence of interest is the same as the low certainty user; and
an interest re-estimation processing by the perceptual reaction analyzer to perform the perceptual reaction information receiving processing, the perceptual reaction change information generating processing, and the user grouping processing after the perceptual reaction trial processing, so as to estimate the presence/absence of interest of the low certainty user with respect to the tried operation.

15. The perceptual reaction analyzing method according to claim 14, wherein
the perceptual reaction analyzer generates the certainty level after performing the interest re-estimation processing, and repeats the perceptual reaction trial processing and the interest re-estimation processing again when the certainty level of the low certainty user is lower than the threshold.

16. The perceptual reaction analyzing method according to claim 14, wherein
the perceptual reaction information includes at least one of reaction concerning a distance between the terminal and the user of the terminal, reaction concerning a size of a display area of the content on the terminal, and reaction concerning a sound volume of the content on the terminal.

17. The perceptual reaction analyzing method according to claim 14, wherein
in performing the perceptual reaction trial processing, the perceptual reaction analyzer executes at least one of sound volume adjusting processing to increase/decrease a sound volume of the content on the terminal, and display area adjusting processing to expand/reduce a display area of the content on the terminal, based on the perceptual reaction information of a user of which presence/absence of interest is the same as the low certainty user.

18. A non-transitory computer-readable medium embodying a program for causing a perceptual reaction analyzer to perform a perceptual reaction analyzing processing to transmit content to a plurality of terminals connected via a network and estimate presence/absence of interest of users of the plurality of terminals, based on perceptual reaction information generated by each of the terminals detecting perceptual reaction of the user of the terminal on the content for a predetermined period, the perceptual reaction analyzing processing comprising:
a content transmitting processing to transmit content to the terminals;
a perceptual reaction information receiving processing to receive perceptual reaction information detected by each of the plurality of terminals;
a perceptual reaction change information generating processing to generate perceptual reaction change information which indicates a change of perceptual reaction of the users of the plurality of terminals based on the received perceptual reaction information;

a user grouping processing to estimate the presence/absence of interest of the users of the plurality of terminals based on the perceptual reaction change information, and classify the users into groups corresponding to the presence/absence of the interest;

a certainty level generating processing to generate a certainty level which indicates a degree of certainty of the presence/absence of interest estimated for each user based on the perceptual reaction change information;

a perceptual reaction trial processing to try, for a low certainty user of which certainty level is lower than a threshold, an operation on the content corresponding to the perceptual reaction by which the same presence/absence of interest of the low certainty user is estimated again, based on the perceptual reaction information of a user of which presence/absence of interest is the same as the low certainty user; and an interest re-estimation processing to perform the perceptual reaction information receiving processing, the perceptual reaction change information generating processing, and the user grouping processing after the perceptual reaction trial processing, so as to estimate the presence/absence of interest of the low certainty user with respect to the tried operation.

19. The program according to claim 18, the perceptual reaction analyzing processing further comprising:

performing the certainty level generating processing to generate the certainty level after the interest re-estimation processing; and repeating the perceptual reaction trial processing and the interest re-estimation processing again when the certainty level of the low certainty user is lower than the threshold.

20. The program according to claim 18, wherein
the perceptual reaction information includes at least one of reaction concerning a distance between the terminal and the user of the terminal, reaction concerning a size of a display area of the content on the terminal, and reaction concerning a sound volume of the content on the terminal.

21. The program according to claim 18, wherein in the perceptual reaction trial processing, at least one of sound volume adjusting processing to increase/decrease a sound volume of the content on the terminal, and display area adjusting processing to expand/reduce a display area of the content on the terminal, based on the perceptual reaction information of a user of which presence/absence of interest is the same as the low certainty user.

\* \* \* \* \*